United States Patent
Kyojima et al.

(10) Patent No.: US 9,147,142 B2
(45) Date of Patent: Sep. 29, 2015

(54) INFORMATION PROCESSING APPARATUS, INFORMATION PROCESSING PROGRAM, INFORMATION PROCESSING METHOD, AND COMPUTER-READABLE MEDIUM

(71) Applicant: FUJI XEROX CO., LTD., Tokyo (JP)

(72) Inventors: Masaki Kyojima, Yokohama (JP); Kazuo Saito, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/386,241

(22) PCT Filed: Mar. 25, 2013

(86) PCT No.: PCT/JP2013/058585
§ 371 (c)(1),
(2) Date: Sep. 18, 2014

(87) PCT Pub. No.: WO2013/175849
PCT Pub. Date: Nov. 28, 2013

(65) Prior Publication Data
US 2015/0043032 A1    Feb. 12, 2015

(30) Foreign Application Priority Data
May 23, 2012  (JP) .................................. 2012-117230

(51) Int. Cl.
| | | |
|---|---|---|
| *G06F 15/00* | (2006.01) | |
| *G06F 3/12* | (2006.01) | |
| *G06K 1/00* | (2006.01) | |
| *G06K 15/02* | (2006.01) | |
| *G06F 3/03* | (2006.01) | |
| *G06F 3/0354* | (2013.01) | |

(52) U.S. Cl.
CPC .......... *G06K 15/1897* (2013.01); *G06F 3/0321* (2013.01); *G06F 3/03545* (2013.01); *G06K 15/181* (2013.01)

(58) Field of Classification Search
CPC ............. G06K 15/1897; G06K 15/181; G06F 3/0321; G06F 3/03545
USPC ................................................. 358/1.15, 1.18
See application file for complete search history.

(56) References Cited

U.S. PATENT DOCUMENTS 7,929,811 B2 *  4/2011  Onishi et al. .................. 382/312
8,687,919 B2 *  4/2014  Saito ............................. 382/284

FOREIGN PATENT DOCUMENTS

| JP | A-2005-215815 | 8/2005 |
|---|---|---|
| JP | A-2006-127396 | 5/2006 |
| JP | A-2006-286698 | 10/2006 |

OTHER PUBLICATIONS

International Search Report issued in International Application No. PCT/JP2013/058585 dated May 14, 2013.

*Primary Examiner* — Douglas Tran
(74) *Attorney, Agent, or Firm* — Oliff PLC

(57) ABSTRACT

An information processing apparatus includes a reception unit receiving the number of sheet identifiers to be allocated to a form definition, a comparison unit comparing the number of sheet identifiers received by the reception unit with the number of usable sheet identifiers, an information allocation unit allocating the number of usable sheet identifiers being equal to or greater than the number of sheet identifiers received by the reception unit among the usable sheet identifiers as a definition identifier to the form definition when the comparison result of the comparison unit shows that the number of sheet identifiers received by the reception unit is equal to or less than the number of usable sheet identifiers, a prohibition unit excluding the sheet identifiers included in the definition identifier from the sheet identifiers to be allocated later, and an association unit associating the definition identifier with the form definition.

6 Claims, 23 Drawing Sheets

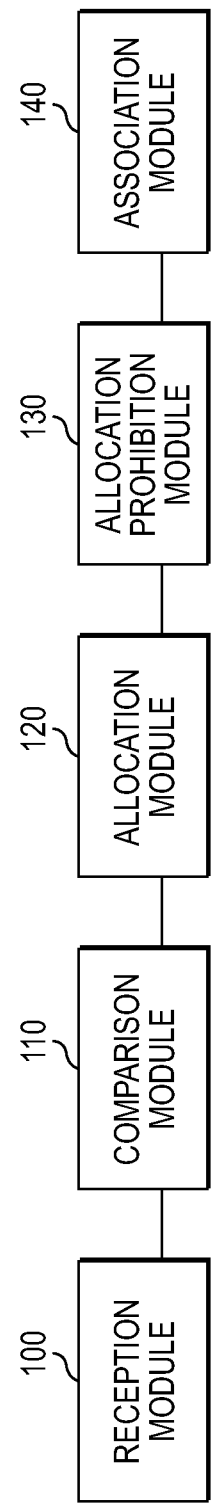

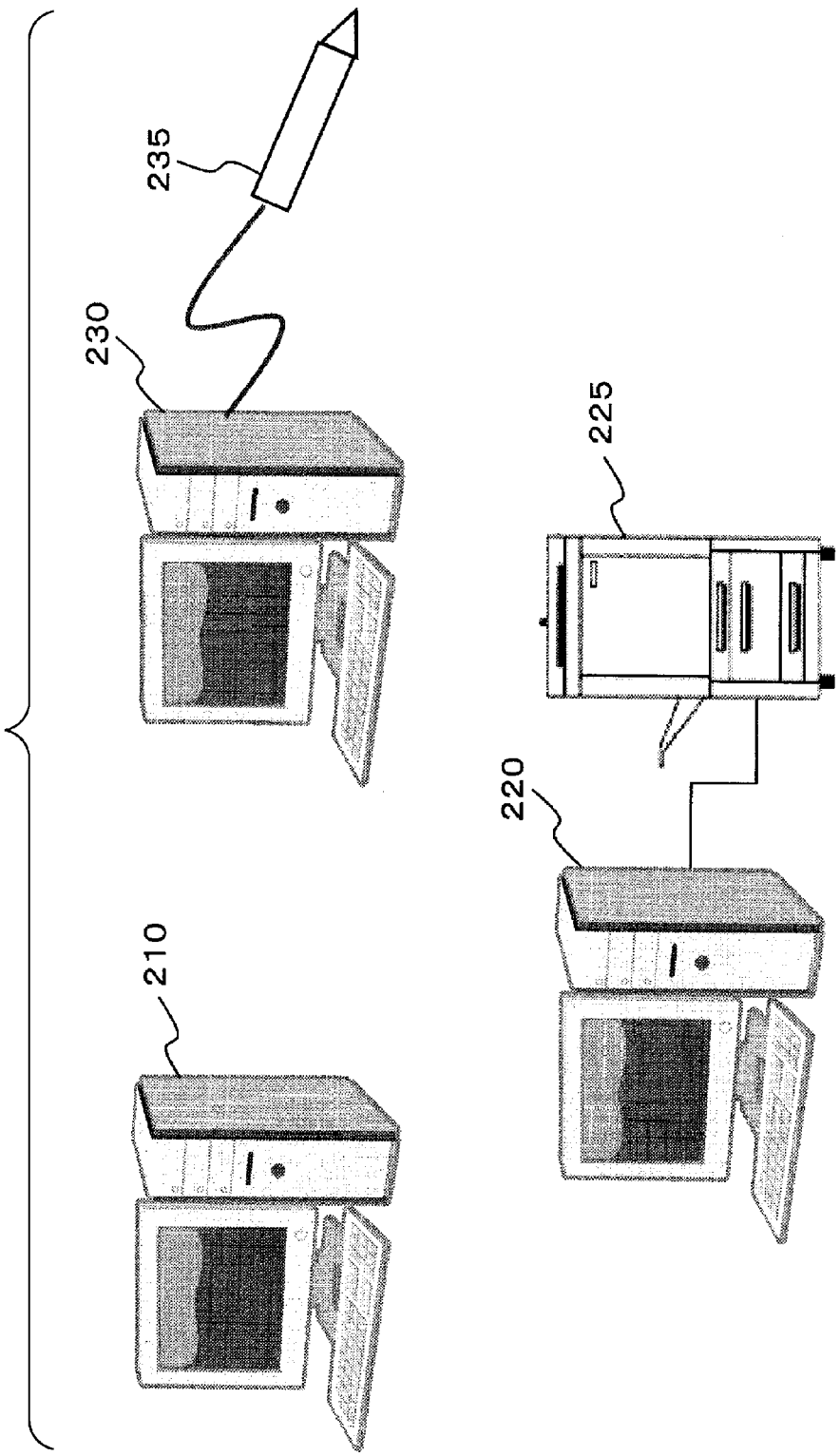

FIG. 3A

QUESTIONNAIRE

/ /

1. Please indicate your gender.
   ☐ Male    ☐ Female

2. Please indicate your age.
   ☐ Teenager  ☐ 20S  ☐ 30S  ☐ 40S
   ☐ 50S       ☐ 60S  ☐ 70S  ☐ 80S and older 3. Please indicate your job.
   ☐ Student        ☐ Employed       ☐ Homemaker
   ☐ Public servant ☐ Self-employed  ☐ Others  (           )

4. Where do you live?
   (                              )

5. Please indicate you feeling about the current event.
   ☐ Very good  ☐ Good  ☐ Medium  ☐ Bad  ☐ Very bad 6. How do you get the current event information?
   ☐ Television  ☐ Radio          ☐ Newspaper    ☐ Internet
   ☐ Magazine    ☐ Local newspaper ☐ Acquaintances ☐ Others  (      )

7. Who did you come with?
   ☐ Family  ☐ Relatives  ☐ Friends, Acquaintances  ☐ Others  (      )

8. How many times have you visited the current event?
   ☐ One time  ☐ Two times  ☐ Three times or more  ☐ Ten times or more 9. What do you think is the best event? (Multiple answers)
   (                                                      )

10. If you have opinions and suggestions, please write them.

Thank you for your cooperation.

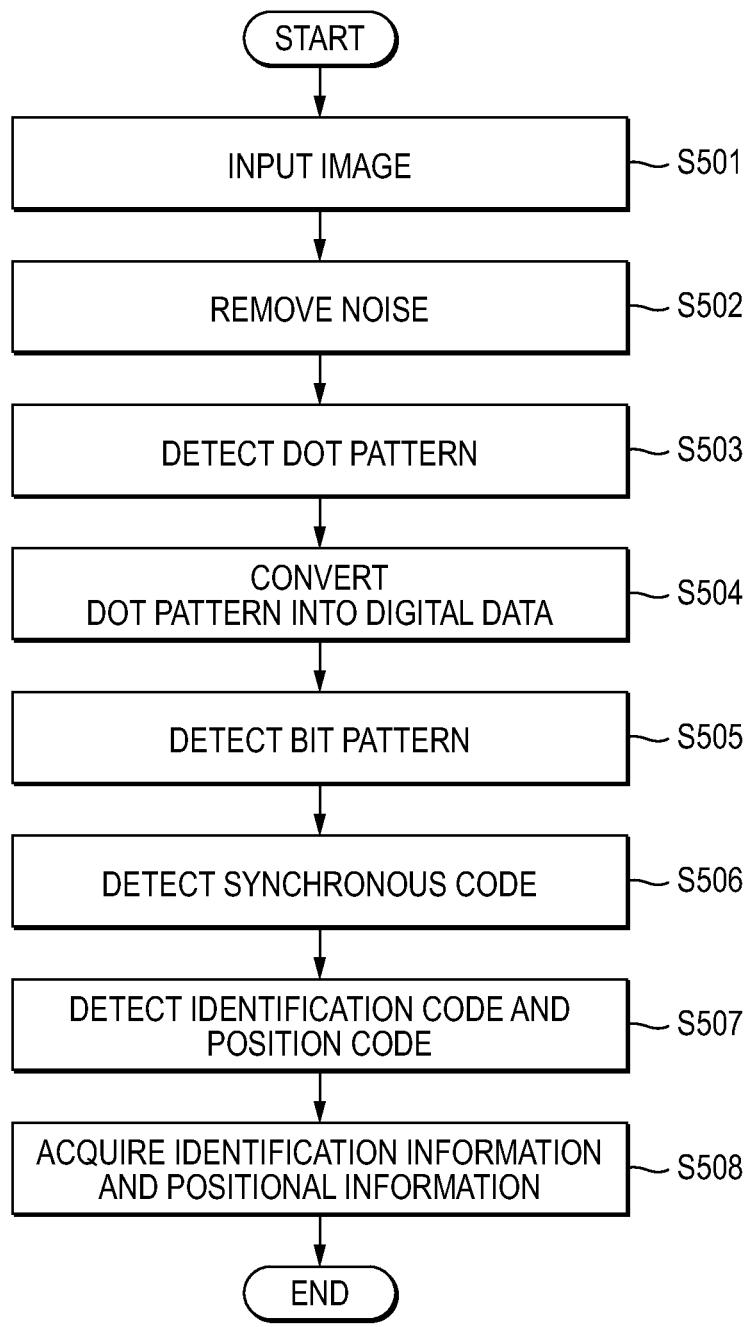

QUESTIONNAIRE

/ /

1. Please indicate your gender.
   ☐ Male    ☐ Female

2. Please indicate your age.
   ☐ Teenager  ☐ 20S  ☐ 30S  ☐ 40S
   ☐ 50S       ☐ 60S  ☐ 70S  ☐ 80S and older 3. Please indicate your job.
   ☐ Student         ☐ Employed       ☐ Homemaker
   ☐ Public servant  ☐ Self-employed  ☐ Others  (          )

4. Where do you live?
   (                    )

5. Please indicate you feeling about the current event.
   ☐ Very good  ☐ Good  ☐ Medium  ☐ Bad  ☐ Very bad 6. How do you get the current event information?
   ☐ Television  ☐ Radio          ☐ Newspaper     ☐ Internet
   ☐ Magazine    ☐ Local newspaper ☐ Acquaintances ☐ Others  (          )

7. Who did you come with?
   ☐ Family  ☐ Relatives  ☐ Friends, Acquaintances  ☐ Others  (          )

8. How many times have you visited the current event?
   ☐ One time  ☐ Two times  ☐ Three times or more  ☐ Ten times or more 9. What do you think is the best event? (Multiple answers)
   (                                                          )

10. If you have opinions and suggestions, please write them.
    [                                                         ]

Thank you for your cooperation.

QUESTIONNAIRE

1. Please indicate your gender.
   - ☐ Male   ☐ Female 624, 626, 628

2. Please indicate your age.
   - ☐ Teenager  ☐ 20S  ☐ 30S  ☐ 40S
   - ☐ 50S       ☐ 60S  ☐ 70S  ☐ 80S and older 3. Please indicate your job.
   - ☐ Student        ☐ Employed      ☐ Homemaker
   - ☐ Public servant ☐ Self-employed ☐ Others   (         )

4. Where do you live?
   ( _____ )

5. Please indicate you feeling about the current event.
   - ☐ Very good  ☐ Good  ☐ Medium  ☐ Bad  ☐ Very bad 6. How do you get the current event information?
   - ☐ Television  ☐ Radio          ☐ Newspaper     ☐ Internet
   - ☐ Magazine    ☐ Local newspaper ☐ Acquaintances ☐ Others  (         )

7. Who did you come with?
   - ☐ Family  ☐ Relatives  ☐ Friends, Acquaintances  ☐ Others  (         )

8. How many times have you visited the current event?
   - ☐ One time  ☐ Two times  ☐ Three times or more  ☐ Ten times or more 9. What do you think is the best event? (Multiple answers)
   ( _____ )

10. If you have opinions and suggestions, please write them.
    [                                                  ]

Thank you for your cooperation.

FIG. 7B

| SYNCHRONOUS CODE 2 BITS | X POSITION CODE 5 BITS | X POSITION CODE 5 BITS | X POSITION CODE 5 BITS | X POSITION CODE 5 BITS |
|---|---|---|---|---|
| Y POSITION CODE 5 BITS | IDENTIFICATION CODE 5 BITS | IDENTIFICATION CODE 5 BITS | IDENTIFICATION CODE 5 BITS | IDENTIFICATION CODE 5 BITS |
| Y POSITION CODE 5 BITS | IDENTIFICATION CODE 5 BITS | IDENTIFICATION CODE 5 BITS | IDENTIFICATION CODE 5 BITS | IDENTIFICATION CODE 5 BITS |
| Y POSITION CODE 5 BITS | IDENTIFICATION CODE 5 BITS | IDENTIFICATION CODE 5 BITS | IDENTIFICATION CODE 5 BITS | IDENTIFICATION CODE 5 BITS |
| Y POSITION CODE 5 BITS | IDENTIFICATION CODE 5 BITS | IDENTIFICATION CODE 5 BITS | IDENTIFICATION CODE 5 BITS | IDENTIFICATION CODE 5 BITS |

FIG. 10

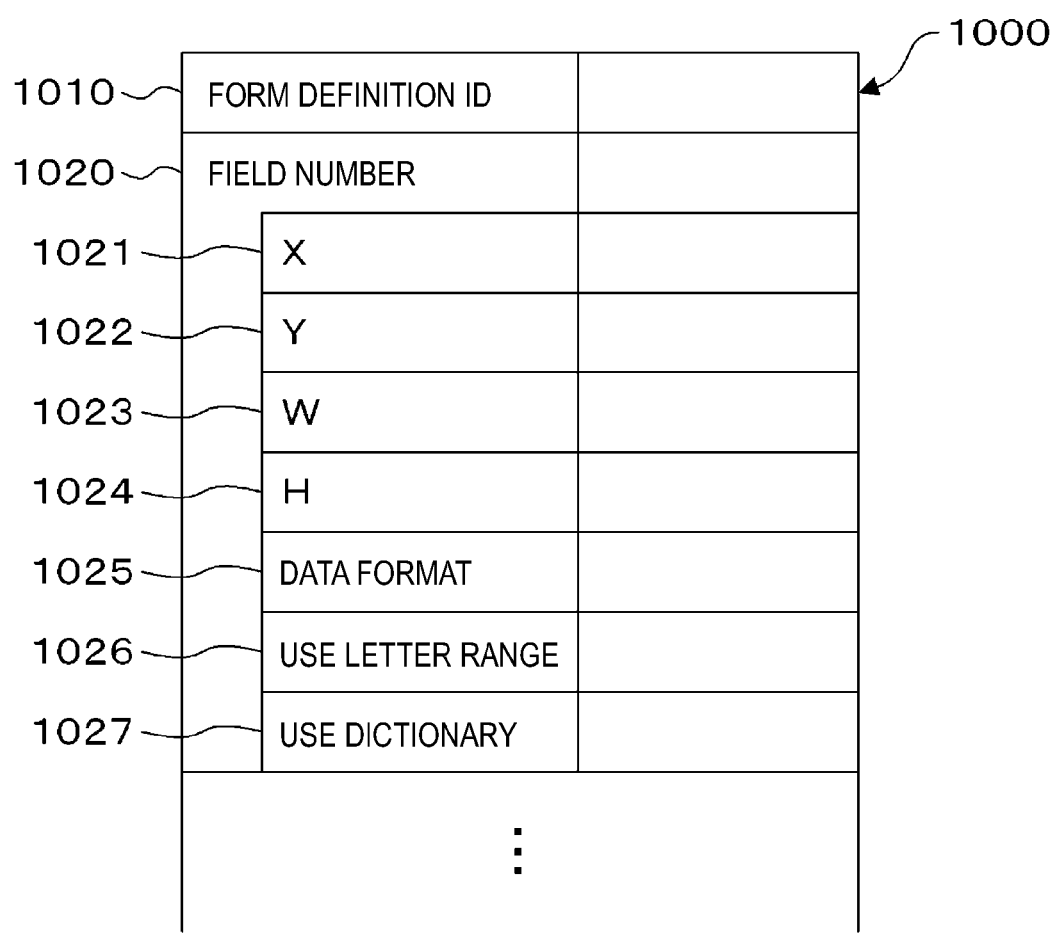

| | | |
|---|---|---|
| 1010 | FORM DEFINITION ID | |
| 1020 | FIELD NUMBER | |
| 1021 | X | |
| 1022 | Y | |
| 1023 | W | |
| 1024 | H | |
| 1025 | DATA FORMAT | |
| 1026 | USE LETTER RANGE | |
| 1027 | USE DICTIONARY | |

| IDENTIFIER DEFINITION | FORM IDENTIFIED ID | FORM IMAGE ID |
|---|---|---|
| 1110 | 1120 | 1130 |
|  |  |  |

1100

INFORMATION PROCESSING APPARATUS, INFORMATION PROCESSING PROGRAM, INFORMATION PROCESSING METHOD, AND COMPUTER-READABLE MEDIUM

TECHNICAL FIELD

The present invention relates to an information processing apparatus, an information processing program, an information processing method, and a computer-readable medium.

BACKGROUND ART

Patent Literature 1 discloses a system including a terminal apparatus, a document server, and an identification information server in order to improve convenience when writing information is handled. The terminal apparatus generates writing information using a writing generation unit on the basis of positional information acquired from an electronic pen and transmits the writing information and identification information acquired from the electronic pen to an identification information server. The identification information server generates a writing file obtained by adding writing information to link information to a duplicate document for an electronic document corresponding to the received identification information using a file generation unit and transmits the writing file to the terminal apparatus. The terminal apparatus manages the received writing file using a file management unit and requests the document server to acquire the electronic document on the basis of the link information, in response to an operation for the writing file. The document server acquires the requested electronic document using a document acquisition unit and transmits the electronic document to the terminal apparatus.

CITATION LIST

Patent Literature

Patent Literature 1: JP-A-2007-286698

SUMMARY OF INVENTION

Technical Problem

An object of the invention is to provide an information processing apparatus and an information processing program which can associate sheet identifiers which are used to print an information image on a sheet as a definition identifier with a form definition which is a definition of fields in a sheet.

Solution to Problem

[1] According to an aspect of the invention, it is an information processing apparatus comprising: a reception unit that receives the number of sheet identifiers to be allocated to a form definition which is information indicating a definition for an entry field in a sheet; a comparison unit that compares the number of sheet identifiers received by the reception unit with the number of usable sheet identifiers which are information for identifying the sheet; an information allocation unit that allocates the number of usable sheet identifiers that is equal to or greater than the number of sheet identifiers received by the reception unit among the usable sheet identifiers as a definition identifier to the form definition when the comparison result of the comparison unit shows that the number of sheet identifiers received by the reception unit is equal to or less than the number of usable sheet identifiers; a prohibition unit that excludes the sheet identifiers included in the definition identifier from the sheet identifiers to be allocated later; and an association unit that associates the definition identifier with the form definition, wherein the sheet identifier is used to print an information image indicating the sheet identifier on the sheet.

[2] It is the information processing apparatus according to [1], further comprising: a generation unit that generates an information image indicating the sheet identifier included in the definition identifier which is allocated to the form definition; and a printing unit that superimposes the information image generated by the generation unit on document information and prints the document information on the sheet.

[3] It is an information processing apparatus comprising: a reception unit that receives, as writing information, content written to a sheet on which document information is printed and a sheet identifier which is information for identifying the sheet; a first determination unit that determines whether to be able to extract an electronic document corresponding to the sheet identifier in the writing information which is received by the reception unit; a second determination unit that determines whether to be able to extract a form definition associated with a definition identifier including the sheet identifier from a first storage unit which stores the definition identifier and the form definition so as to be associated with each other when the first determination unit determines not to be able to extract the electronic document; an extraction unit that extracts the form definition from the first storage unit when the second determination unit determines to be able to extract the form definition; a generation unit that generates the electronic document on the basis of the form definition extracted by the extraction unit; and a superimposition unit that superimposes the written content in the writing information received by the reception unit on the electronic document generated by the generation unit.

[4] It is the information processing apparatus according to [3], further comprising: a storage control unit that performs control such that the writing information received by the reception unit is stored in a second storage unit when the second determination unit determines not to extract the form definition.

[5] It is the information processing apparatus according to [4], wherein, when a new combination of the definition identifier and the form definition is stored in the first storage unit, the second determination unit determines whether to be able to extract, from the first storage unit, a form definition corresponding to the sheet identifier in the writing information which is stored in the second storage unit.

[6] According to another aspect of the invention, it is a program causing a computer to function as: a reception unit that receives the number of sheet identifiers to be allocated to a form definition which is information indicating a definition for an entry field in a sheet; a comparison unit that compares the number of sheet identifiers received by the reception unit with the number of usable sheet identifiers which are information for identifying the sheet; an information allocation unit that allocates the number of usable sheet identifiers that is equal to or greater than the number of sheet identifiers received by the reception unit among the usable sheet identifiers as a definition identifier to the form definition when the comparison result of the comparison unit shows that the number of sheet identifiers received by the reception unit is equal to or less than the number of usable sheet identifiers; a prohibition unit that excludes the sheet identifiers included in the definition identifier from the sheet identifiers to be allocated later; and an association unit that associates the definition identifier with the form definition, wherein the sheet identifier is used to print an information image indicating the sheet identifier on the sheet.

[7] According to another aspect of the invention, it is a program causing a computer to function as: a reception unit that receives, as writing information, content written to a sheet on which document information is printed and a sheet identifier which is information for identifying the sheet; a first determination unit that determines whether to be able to extract an electronic document corresponding to the sheet identifier in the writing information which is received by the reception unit; a second determination unit that determines whether to be able to extract a form definition associated with a definition identifier including the sheet identifier from a first storage unit which stores the definition identifier and the form definition so as to be associated with each other when the first determination unit determines not to be able to extract the electronic document; an extraction unit that extracts the form definition from the first storage unit when the second determination unit determines to be able to extract the form definition; a generation unit that generates the electronic document on the basis of the form definition extracted by the extraction unit; and a superimposition unit that superimposes the written content in the writing information received by the reception unit on the electronic document generated by the generation unit.

[8] According to another aspect of the invention, it is an information processing method causing a computer to execute a process, the process comprising: receiving the number of sheet identifiers to be allocated to a form definition which is information indicating a definition for an entry field in a sheet; comparing the received number of sheet identifiers with the number of usable sheet identifiers which are information for identifying the sheet; allocating the number of usable sheet identifiers that is equal to or greater than the received number of sheet identifiers among the usable sheet identifiers as a definition identifier to the form definition when the comparison result shows that the received number of sheet identifiers is equal to or less than the number of usable sheet identifiers; excluding the sheet identifiers included in the definition identifier from the sheet identifiers to be allocated later; and associating the definition identifier with the form definition, wherein the sheet identifier is used to print an information image indicating the sheet identifier on the sheet.

[9] According to another aspect of the invention, it is an information processing method causing a computer to execute a process, the process comprising: receiving, as writing information, content written to a sheet on which document information is printed and a sheet identifier which is information for identifying the sheet; determining whether to be able to extract an electronic document corresponding to the sheet identifier in the received writing information; determining whether to be able to extract a form definition associated with a definition identifier including the sheet identifier from a first storage unit which stores the definition identifier and the form definition so as to be associated with each other when it is determined not to be able to extract the electronic document; extracting the form definition from the first storage unit when it is determined to be able to extract the form definition; generating the electronic document on the basis of the extracted form definition; and superimposing the written content in the received writing information on the generated electronic document.

[10] According to another aspect of the invention, it is a non-transitory computer readable medium storing a program causing a computer to execute a process for information processing, the process comprising: receiving the number of sheet identifiers to be allocated to a form definition which is information indicating a definition for an entry field in a sheet; comparing the received number of sheet identifiers with the number of usable sheet identifiers which are information for identifying the sheet; allocating the number of usable sheet identifiers that is equal to or greater than the received number of sheet identifiers among the usable sheet identifiers as a definition identifier to the form definition when the comparison result shows that the received number of sheet identifiers is equal to or less than the number of usable sheet identifiers; excluding the sheet identifier included in the definition identifier from the sheet identifiers to be allocated later; and associating the definition identifier with the form definition, wherein the sheet identifier is used to print an information image indicating the sheet identifier on the sheet.

[11] According to another aspect of the invention, it is a non-transitory computer readable medium storing a program causing a computer to execute a process for information processing, the process comprising: receiving, as writing information, content written to a sheet on which document information is printed and a sheet identifier which is information for identifying the sheet; determining whether to be able to extract an electronic document corresponding to the sheet identifier in the received writing information; determining whether to be able to extract a form definition associated with a definition identifier including the sheet identifier from a first storage unit which stores the definition identifier and the form definition so as to be associated with each other when it is determined not to be able to extract the electronic document; extracting the form definition from the first storage unit when it is determined to be able to extract the form definition; generating the electronic document on the basis of the extracted form definition; and superimposing the written content in the received writing information on the generated electronic document.

Advantageous Effects of Invention

According to the information processing apparatus described in [1], it is possible to associate sheet identifiers which are used to print an information image on a sheet as a definition identifier with a form definition which is a definition of entry fields in the sheet.

According to the information processing apparatus described in [2], it is possible to print, on a sheet, an information image formed on the basis of the sheet identifier which is allocated as the definition identifier to the form definition.

According to the information processing apparatus described in [3], even when a document corresponding to the sheet identifier is not extracted, it is possible to generate the document corresponding to the sheet identifier and to superimpose written data on the document.

According to the information processing apparatus described in [4], even when the form definition can't be extracted using the sheet identifier, it is possible to store the writing information.

According to the information processing apparatus described in [5], when a new combination of the definition identifier and the form definition is stored, it is possible to generate a document corresponding to the writing information which has not been superimposed on any document and to superimpose the writing information on the document.

According to the information processing program described in [6], it is possible to associate sheet identifier which is required to print an information image on a sheet as a definition identifier with a field definition which is a definition of entry fields in the sheet.

According to the information processing program described in [7], even when a document corresponding to the sheet identifier is not extracted, it is possible to generate the document corresponding to the sheet identifier and to superimpose written data on the document.

According to the information processing method described in [8], it is possible to associate sheet identifier which is required to print an information image on a sheet as a definition identifier with a field definition which is a definition of entry fields in the sheet.

According to the information processing method described in [9], even when a document corresponding to the sheet identifier can't be extracted, it is possible to generate the document corresponding to the sheet identifier and to superimpose written data on the document.

According to the computer-readable medium described in [10], it is possible to associate sheet identifier which is required to print an information image on a sheet as a definition identifier with a field definition which is a definition of entry fields in the sheet.

According to the computer-readable medium described in [11], even when a document corresponding to the sheet identifier is not extracted, it is possible to generate the document corresponding to the sheet identifier and to superimpose written data on the document.

BRIEF DESCRIPTION OF DRAWINGS

FIG. 1 is a conceptual module configuration diagram illustrating an example of a structure according to an embodiment.

FIG. 2 is a diagram illustrating an example of a system when this embodiment is achieved.

FIG. 3A is a diagram illustrating an example of an electronic pen sheet on which an information image is printed.

FIG. 5 is a flowchart illustrating an example of a process of the electronic pen.

FIG. 6A is a diagram illustrating an example of a form image.

FIG. 6B is a diagram illustrating an example of field definition.

FIG. 7B is a diagram illustrating an example of the arrangement of code patterns.

FIG. 10 is a diagram illustrating an example of the data structure of a field definition table.

FIG. 11 is a diagram illustrating an example of the data structure of a paper ID-form definition correspondence table.

DESCRIPTION OF EMBODIMENTS

Figure 3B:
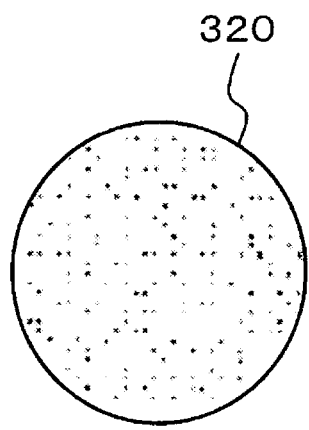
FIG. 3B is an enlarged view illustrating a region of the electronic pen sheet on which the information image is printed.

Hereinafter, an example of a preferred embodiment of the invention will be described with reference to the drawings.

FIG. 1 is a conceptual module configuration diagram illustrating an example of a structure according to this embodiment.

Generally, a module indicates a product, such as software (computer program) or hardware that can be logically separated. Therefore, in this embodiment, the module is not only a module of a computer program, but also a module of a hardware configuration. Thus, in this embodiment, a computer program for causing a computer to function as the module (a program for causing a computer to execute each process, a program for causing a computer to function as each means, and a program for causing a computer to implement each function), a system, and a method will be described. While expressions, such as "store", "make A store", and equivalents thereof, are used for convenience of explanation, these expressions mean storing a computer program in a storage device or performing control such that the computer program is stored in a storage device when the embodiment relates to the computer program. The modules may be in one-to-one correspondence with functions. In the case of mounting, one module may be implemented by one program or plural modules may be implemented by one program. Conversely, one module may be implemented by the plural programs. In addition, the plural modules may be executed by one computer or one module may be executed by the plural computers in a distributed or parallel environment. One module may include another module. Hereinafter, the term "connection" includes not only physical connection, but also logical connection (for example, the transmission and reception of data, instructions, and the reference relationship between data). The term "predetermined" means being determined prior to a target process, and includes the meaning of being determined prior to a target process before the process according to this embodiment starts and also includes the meaning of being determined prior to a target process even after the process according to this embodiment starts, in accordance with the current situation/state or in accordance with the previous situation/state. If there are plural "predetermined values", they may be different from each other or two or more values (or all of the values) may be equal to each other. A description having the meaning "in the case of A, B is performed" is used as the meaning "it is determined whether case A is satisfied and B is performed when it is determined that case A is satisfied" unless such a determination is necessary.

A system or an apparatus may be configured by connecting, for example, the plural computers, hardware components, and devices, using communication means, such as a network (including communication connection based on a one-on-one correspondence). In addition, the system or the apparatus may be configured by, for example, one computer, one hardware component, and one device. The terms "apparatus" and "system" are used synonymously. The term "system" does not include merely a man-made social "mechanism" (social system).

Furthermore, whenever a process is performed by each module or whenever plural processes are performed in the module, target information is read from a storage device. After the process is performed, the processing result is written in the storage device. Therefore, the description of the reading of information from the storage device before a process or the writing of information to the storage device after a process may be omitted. Examples of the storage device may include a hard disk, a random access memory (RAM), an external storage medium, a storage device connected through a communication line, and a register in a central processing unit (CPU).

Sheet identifier is information for specifying sheets one by one and is the same as a paper ID, which will be described. An information image indicating the sheet identifier is printed on a sheet and it is possible to uniquely identify the sheet using the sheet identifier. An information processing apparatus according to this embodiment associates the sheet identifier, which is information required to print the information image on a sheet, as a definition identifier with form definition which is definition related to an entry field in the sheet. As shown in the example of FIG. 1, the information processing apparatus includes a reception module 100, a comparison module 110, an allocation module 120, an allocation prohibition module 130, and an association module 140.

The information processing apparatus relates to a technique which, when data is written on a page face with an electronic pen, converts the data into electronic data to acquire writing information. In this technique, first, a unique information image (code pattern) is printed at positions on the page face. Then, when data is written on the page face with the electronic pen, the electronic pen reads the information image at the position corresponding to a pen tip, decodes the read information image, and determines a writing position. Then, the electronic pen generates writing information from plural determined writing positions.

The reception module 100 is connected to the comparison module 110. The reception module 100 receives the number of sheet identifiers allocated to the form definition which is information indicating definition related to the entry field in the sheet. The term "information indicating definition related to the entry field in the sheet" means, for example, information for recognizing data described in the entry field in the sheet. Information indicating the position of the entry field and the range of letters to be written in the field is given as an example of the information. Specifically, the information will be described below using a field definition table 1000 shown in FIG. 10. The term "number of sheet identifiers" means the number of sheets printed using the form definition. The reception module 100 may receive the number of sheet identifiers in response to a keyboard operation of an operator, such as an administrator, or it may receive a predetermined number of sheet identifiers. The operator does not need to recognize the information as the number of sheet identifiers, but may recognize the information as the number of sheets to be printed. The term "sheet" means paper on which, for example, letters are written by hand. For example, examples of the sheet include a form and a questionnaire.

The comparison module 110 is connected to the reception module 100 and the allocation module 120. The comparison module 110 compares the number of sheet identifiers received by the reception module 100 with the number of usable sheet identifiers which are information for identifying the sheet. The term "sheet identifier" is information for uniquely identifying the sheet in this embodiment. The information image indicating the sheet identifier is printed on the sheet and it is possible to uniquely identify the sheet using the sheet identifier. The use of the sheet identifier (the printing of the information image indicating the sheet identifier on the sheet) is managed. For example, in this embodiment, a predetermined range of the sheet identifier is set by the user. When the sheet identifier is actually used in the set range, the use of the sheet identifier is managed such that the sheet identifier is not used for other sheets (see a process of the allocation prohibition module 130 which will be described below). The one-to-one relationship between the sheet identifier and the sheet is maintained through the above-mentioned management. Here, the comparison is performed in order to determine whether there are a sufficient number of sheet identifiers which have not been allocated to any form definition, but can be newly allocated to the form definition among the sheet identifiers.

The allocation module 120 is connected to the comparison module 110 and the allocation prohibition module 130. When the comparison result of the comparison module 110 shows that the number of sheet identifiers received by the reception module 100 is equal to or less than the number of usable sheet identifiers, the allocation module 120 allocates the usable sheet identifiers as a definition identifier to the form definition. Specifically, the term "allocation" means generating correspondence between the form definition and the definition identifier associated with the form definition (registering the usable sheet identifiers in a correspondence table 1100 shown in FIG. 11 which will be described below).

Here, the same number of sheet identifiers as that received by the reception module 100 may be allocated as the definition identifier to the form definition or the number of sheet identifiers that is greater than the number of sheet identifiers received by the reception module 100 may be allocated as the definition identifier. Since the possibility that the number of necessary sheet identifiers will be insufficient is thoroughly considered based on various accidents, it is effective to allocate a larger number of sheet identifiers considering the risk.

When the number of sheet identifiers received by the reception module 100 is greater than the number of usable sheet identifiers, information indicating that the sheet identifiers cannot be allocated may be displayed on a display device and information indicating that the number of sheet identifiers which is less than the number of usable sheet identifiers needs to be designated may be displayed. Alternatively, in this case, the processes of the information processing apparatus may end.

The allocation prohibition module 130 is connected to the allocation module 120 and the association module 140. The allocation prohibition module 130 excludes the sheet identifier (the sheet identifier included in the definition identifier) to be allocated by the allocation module 120 from the targets to be allocated later. The term "exclusion from the targets to be allocated later" means that the sheet identifier will not be allocated to the form definition later. For example, the term "exclusion from the targets to be allocated later" means deleting the sheet identifier to be allocated from usable sheet identifiers. Specifically, for example, there is a method which attaches a flag indicating whether the sheet identifier is usable to each sheet identifier, sets the flag so as to indicate that the sheet identifier to be allocated is not usable, and deletes the sheet identifier to be allocated from a table storing the usable sheet identifier.

The association module 140 is connected to the allocation prohibition module 130. The association module 140 associates the sheet identifiers as the definition identifier to be allocated by the allocation module 120 with the form definition. Therefore, an electronic pen sheet printing system 220 and a writing information processing system 230, which will be described below, can access the corresponding form definition using the sheet identifier as a starting point. Information about the correspondence between the form definition and the definition identifier associated with the form definition is transmitted to the electronic pen sheet printing system 220 and the writing information processing system 230.

FIG. 2 is a diagram illustrating an example of a system when this embodiment is achieved.

There are a form definition generation system 210, the electronic pen sheet printing system 220, and the writing information processing system 230. A printing system 225 is connected to the electronic pen sheet printing system 220. An electronic pen 235 is connected to the writing information processing system 230.

The form definition generation system 210 associates the sheet identifiers (hereinafter, also referred to as a paper IDs (Identifications)) with information indicating definition related to the entry field in the sheet. The form definition generation system 210 includes the module configuration shown in FIG. 1 or the module configuration shown in FIG. 12, which will be described below, and performs a process according to the flowchart shown in FIG. 13. The electronic pen sheet printing system 220 prints a document on which an information image (hereinafter, also referred to as a dot code image) is superimposed using the paper ID associated by the form definition generation system 210 on a sheet using the printing system 225. The electronic pen sheet printing system 220 includes the module configuration shown in FIG. 14, which will be described below, and performs a process according to the flowchart shown in FIG. 15. When data is written on the sheet which is printed by the electronic pen sheet printing system 220 with the electronic pen 235, the writing information processing system 230 superimposes the writing information on the document. The writing information processing system 230 includes the module configuration shown in FIG. 16 or the module configuration shown in FIG. 17, which will be described below, and performs a process according to the flowchart shown in FIG. 18 or FIG. 19.

In a process related to the electronic pen other than the process according to this embodiment, the correspondence relationship between the field definition which is used to process a form image or data printed on an electronic pen sheet and the paper ID allocated to the sheet is determined when a form is printed to make an electronic pen sheet and is stored in the information processing system. When writing information which is written by the electronic pen is processed, the paper ID is extracted from the writing information and the form image or field definition is extracted on the basis of the information stored in the information processing system.

However, this method cannot be used when the system that prints the electronic pen sheet and the system that processes the writing information have high independence from one another. For example, this method cannot be used when the system that prints the electronic pen sheet and the system that processes the writing information are separate systems, there is no communication line connecting these systems, and these systems are separated from each other. Even when these systems are connected to each other by a communication line, an expensive server system needs to be constructed in order to make the system that prints the electronic pen sheet have a function of providing information to the system that processes the writing information.

The form definition generation system 210, the electronic pen sheet printing system 220, and the writing information processing system 230 are independent in the example shown in FIG. 2. However, they may be connected to each other by a communication line (a wired line, a wireless line, and a combination thereof) or some (for example, the form definition generation system 210 and the electronic pen sheet printing system 220) of them may be connected to each other by the communication line. In this embodiment, information (hereinafter, also referred to as a form definition with a paper ID space) in which the definition identifier and the form definition are associated with each other by the form definition generation system 210 is shared.

For example, there are the following variations as a sharing method. (1) The form definition generation system 210 has a function which can extract a copy of the form definition with a paper ID space generated by the form definition generation system 210 to the outside of the form definition generation system 210. In addition, there are a function which registers the extracted form definition with a paper ID space in the electronic pen sheet printing system 220 and the writing information processing system 230. For example, the copy of the form definition with a paper ID space generated by the form definition generation system 210 is extracted and copied to, for example, a USB memory. Then, the copy of the form definition with a paper ID space is registered in the electronic pen sheet printing system 220 and the writing information processing system 230 through the USB memory. (2) When the form definition generation system 210 and the electronic pen sheet printing system 220 coexist in a single system (for example, a system in which the form definition generation system 210 and the electronic pen sheet printing system 220 are connected through a communication line) and the writing information processing system 230 is independent, the former system including the form definition generation system 210 and the electronic pen sheet printing system 220 has a function which can extract the copy of the form definition with an ID space to the outside of the system and the latter writing information processing system 230 has a function of registering the extracted form definition with a paper ID space.

FIGS. 3A and 3B are diagrams illustrating an example of an electronic pen sheet 310 on which an information image is printed by this embodiment. The electronic pen sheet printing system 220 prints writing information of the electronic pen sheet 310 using the printing system 225. A dot code image is printed on the electronic pen sheet 310. For example, as shown in FIG. 3A, a dot code image which is enlarged in FIG. 3B is printed on a region 320 of the electronic pen sheet 310. The ID (paper ID) allocated to each electronic pen sheet 310 and positional information (X and Y coordinate values) on the sheet are expressed by the dot code image.

For example, the paper ID is a 32-bit value. In the expression of a character string, a character string is represented in hexadecimal. Therefore, the range of the paper ID is from "00000000" to "FFFFFFFF".

Figure 4:
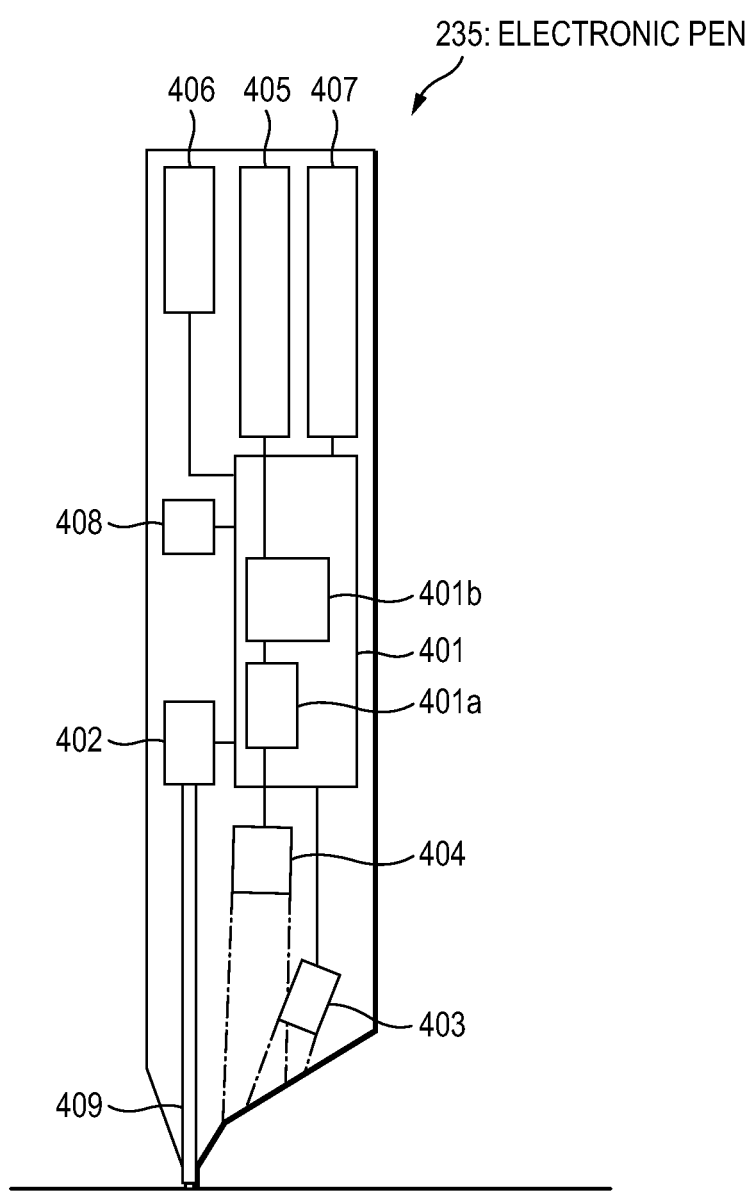
FIG. 4 is a diagram illustrating an example of the internal structure of an electronic pen.

FIG. 4 is a diagram illustrating an example of the internal structure of the electronic pen 235.

The outline of the internal structure will be described. When data is written on the electronic pen sheet 310 by the electronic pen 235 and a pressure sensor is turned on, the electronic pen 235 captures the dot code image on the electronic pen sheet 310, decodes the dot code image to extract the paper ID of the electronic pen sheet 310 and the positional information (X and Y coordinate values) on the electronic pen sheet 310, and stores the paper ID and the positional information in the memory. Then, the information stored in the memory is transmitted to the writing information processing system 230 through the communication circuit.

Next, the internal structure will be described in detail. As shown in FIG. 4, the electronic pen 235 includes a control circuit 401 that controls the overall operation of the pen. The control circuit 401 includes an image processing unit 401a that processes a dot code image detected from an input image and a data processing unit 401b that extracts the paper ID and the positional information from the processing result.

A pressure sensor 402 that detects a writing operation by the electronic pen 235 as pressure applied to pen tip 409 is connected to the control circuit 401. In addition, an infrared LED 403 that irradiates infrared light to the sheet and an infrared CMOS 404 that inputs an image are connected to the control circuit 401. An information memory 405 that stores the paper ID and the positional information, a communication circuit 406 that communicates with an external device, and a battery 407 that drives the pen, and a pen ID memory 408 that stores the identifier (pen ID) of the pen are also connected to the control circuit 401.

Next, the outline of the operation of the electronic pen 235 will be described.

When data is written with the electronic pen 235, the pressure sensor 402 connected to the pen tip 409 detects the writing operation. Then, the infrared LED 403 is turned on and the infrared CMOS 404 captures an image on the sheet using a CMOS sensor.

In addition, the infrared LED 403 is turned on in a pulsed manner in synchronization with the shutter timing of the CMOS sensor in order to suppress power consumption.

The infrared CMOS 404 uses a global shutter CMOS sensor which can transmit the captured images at the same time. Therefore, the infrared CMOS 404 uses a CMOS sensor which is sensitive in an infrared range. In addition, a visible light cut filter is arranged on the entire surface of the CMOS sensor in order to reduce the influence of disturbance. The CMOS sensor captures an image in a cycle of about 70 fps to 100 fps (frame per second). The imaging element is not limited to the CMOS sensor. For example, other imaging elements, such as CCDs, may be used.

When the captured image is input to the control circuit 401, the control circuit 401 acquires the dot code image from the captured image. Then, the control circuit 401 decodes the dot code image to acquire the paper ID and the positional information embedded in the dot code image.

Next, the operation of the control circuit 401 in this case will be described.

FIG. 5 is a flowchart illustrating an example of the process of the electronic pen 235 (control circuit 401).

In Step S501, the image processing unit 401a inputs an image.

In Step S502, the image processing unit 401a performs a process for removing noise included in the image. Here, examples of the noise include a variation in the sensitivity of a CMOS and noise which is generated by the electronic circuit. The type of process for removing noise needs to be determined on the basis of the characteristics of an imaging system of the electronic pen 235. For example, a sharpening process, such as a blurring process or unsharp masking, can be applied.

In Step S503, the image processing unit 401a detects a dot pattern (the position of a dot image) from the image. For example, the image processing unit 401a can perform a binarization process to divide the image into a dot pattern portion and a background portion and detect the dot pattern from each binarized image position. When a large number of noise components are included in the binarized image, it is necessary to combine a filtering process of determining the dot pattern on the basis of, for example, the area or shape of the binarized image.

In Step S504, the image processing unit 401a converts the detected dot pattern into digital data on a two-dimensional array. For example, the image processing unit 401a performs the conversion such that a position where there is a dot is "1" and a position where there is no dot is "0" on the two-dimensional array. The digital data on the two-dimensional array is transmitted from the image processing unit 401a to the data processing unit 401b.

Figure 7A:
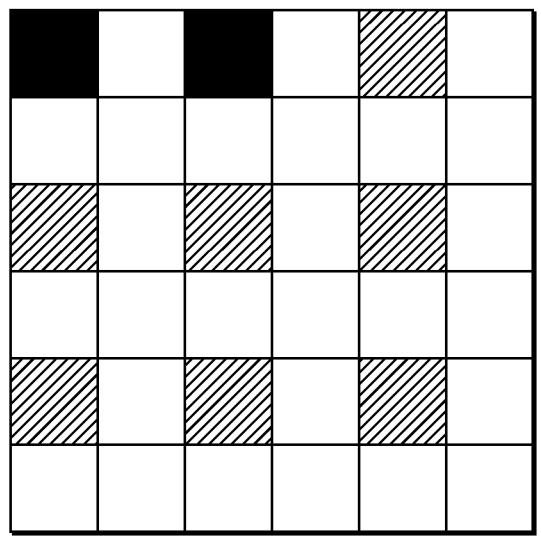
FIG. 7A is a diagram illustrating an example of the arrangement of bit patterns.

Then, in Step S505, the data processing unit 401b detects a bit pattern, which is a combination of two dots shown in FIG. 7A, from the received digital data. For example, the data processing unit 401b can move the boundary position of a block corresponding to the bit pattern on the two-dimensional array and detect the boundary position where two dots are included in the block to detect the bit pattern.

When the bit pattern is detected in this way, the data processing unit 401b detects a synchronous code with reference to the type of bit pattern in Step S506.

Then, in Step S507, the data processing unit 401b detects an identification code and a position code on the basis of the positional relationship from the synchronous code.

Then, in Step S508, the data processing unit 401b decodes the identification code to acquire a paper ID and decodes the position code to acquire positional information. An RS decoding process is performed on the identification code to obtain the paper ID. For the position code, the position of a read partial sequence is compared with an M sequence which is used to generate an image to obtain the positional information.

FIGS. 6A and 6B are diagrams illustrating examples of a form image 610 and field definition 620.

The form definition includes at least the field definition 620 (information indicating definition related to the field in the sheet) and may further include the form image 610. The field definition 620 is information indicating a region to be changed to data among the writing information items and has attribute information (a format when data is obtained, the range of letters used for letter recognition, or the designation of the dictionary to be used) when data is obtained. The field definition 620 includes, for example, an entry field 622 and a check entry field group 624 (including a check entry field 626 and a check entry field 628). Specifically, the field definition 620 is defined by, for example, the field definition table 1000. FIG. 10 is a diagram illustrating an example of the data structure of the field definition table 1000. The field definition table 1000 includes a form definition ID field 1010 and plural (the number of fields in the electronic pen sheet 310) field number fields 1020. The field number field 1020 includes an X field 1021, a Y field 1022, a W field 1023, an H field 1024, a data format field 1025, a use letter range field 1026, and a use dictionary field 1027, in addition to the field number field 1020. The form definition ID field 1010 stores information for uniquely identifying the form definition in this embodiment.

The field number field 1020 stores information for uniquely identifying the entry field in the form definition. The X field 1021 stores the x coordinate of, for example, the upper left side of the entry field (rectangular shape). The Y field 1022 stores the y coordinate of, for example, the upper left side of the entry field. The W field 1023 stores the width of the entry field. The H field 1024 stores the height of the entry field. The data format field 1025 stores the format of data written in the entry field (for example, a letter and a check mark). The use letter range field 1026 stores the use range of the letter written in the entry field (for example, only alphabets or only Katakana). The use dictionary field 1027 stores a dictionary (for example, a name dictionary) which is used to recognize the letter written in the entry field. In addition, the data format field 1025, the use letter range field 1026, and the use dictionary field 1027 are used to recognize data written in the entry field.

The form image 610 is document information which is printed on the sheet and includes, for example, the frame border of the entry field, the name of the entry field, and questions in the case of a questionnaire. In addition, the document information does not include the information image.

The form definition with a paper ID space will be described.

The term "form definition with a paper ID space" is a form definition (which is substantially the field definition 620 when the form image 610 is absent) having a partial space of the paper ID allocated thereto. The partial space has a size of "Start: 00010000, end: 0001FFFF". The form definition with a paper ID space means a combination of the form definition and the partial space of the paper IDs allocated to the form definition. In addition, the plural partial spaces of paper IDs may be allocated to a single form definition with a paper ID space.

Next, an electronic document for storing writing information will be described. In the following description, the electronic document indicates an electronic document for storing writing information.

The electronic document for storing writing information is data including content which is written on the electronic pen sheet 310 by the electronic pen 235 and the field definition 620 (which may include the form image 610). The electronic document for storing writing information includes the following: (1) the paper ID which is allocated to the electronic pen sheet associated with the electronic document for storing writing information; and (2) the field definition which is used to process data written on the electronic document for storing writing information.

The electronic document for storing writing information may include the following: (3) a form image which is printed on the electronic document for storing writing information.

Specifically, for example, the electronic document for storing writing information is formed by a correspondence table 1100. FIG. 11 is a diagram illustrating an example of the data structure of the correspondence table 1100. The association module 140 generates the correspondence table 1100. The correspondence table 1100 includes an identifier field 1110, a form definition ID field 1120, and a form image ID field 1130. The identifier field 1110 stores the definition identifier allocated to the form definition. The form definition ID field 1120 stores a field form definition ID. The form image ID field 1130 stores information (form image ID) for uniquely identifying the form image. The correspondence table 1100 associates the definition identifier (information in the identifier field 1110) allocated to the form definition and the field definition table 1000 (information indicating definition (field definition) related to the field in the sheet)) which can be referred to by the form definition ID.

Next, the code pattern which is the source of the dot code image generated in this embodiment will be described.

FIGS. 7A and 7B are diagrams illustrating an example of the information image (dot code image) which is handled in this embodiment.

First, a bit pattern forming the code pattern will be described.

FIG. 7A shows an example of the arrangement of the bit pattern.

The bit pattern is the minimum unit of information embedding. Here, as shown in FIG. 7A, bits are arranged in two positions which are selected from nine positions. In FIG. 7A, a black rectangle indicates the position where the bit is arranged and a hatched rectangle indicates a position where no bit is arranged. The number of combinations of two positions which are selected from nine positions is 36 (=9C2). Therefore, 36 (5.2 bits) information items can be obtained by this arrangement method.

However, the paper ID and the positional information are represented by 32 information items (5 bits) among 36 information items.

The minimum rectangle shown in FIG. 7A has a size of 2 dots by 2 dots at 600 dpi. Since the size of one dot at 600 dpi is 0.0423 mm, one side of the minimum rectangle is 84.6 μm (=0.0423 mm×2). As the size of the dot forming the code pattern increases, the dot becomes more conspicuous. Therefore, it is preferable that the size of the dot be as small as possible. However, when the size of the dot is too small, the printer cannot print the dot. Therefore, the dot with a size that is greater than 50 μm and less than 100 μm is used. In this case, the printer can form a dot with an optimum printable size. That is, the minimum size of the dot which can be stably formed by the printer is 84.6 μm×84.6 μm.

When the dot has the above-mentioned size, one side of one bit pattern is about 0.5 (=0.0423×2×6) mm.

In addition, the code pattern including the bit pattern will be described.

FIG. 7B shows an example of the arrangement of the code pattern.

The minimum rectangle shown in FIG. 7B corresponds to the bit pattern shown in FIG. 7A. That is, the identification code obtained by encoding the paper ID is embedded using 16 (=4×4) bit patterns. An X position code obtained by encoding positional information in the X direction and a Y position code obtained by encoding positional information in the Y direction are each embedded using four bit patterns. A synchronous code for detecting the position and rotation of the code pattern is embedded in the upper left corner using one bit pattern.

The size of one code pattern is about 2.5 mm since it is equal to the width of five bit patterns. In this embodiment, a code pattern image obtained by imaging the generated code pattern is arranged on the entire surface of the sheet.

Figure 8:
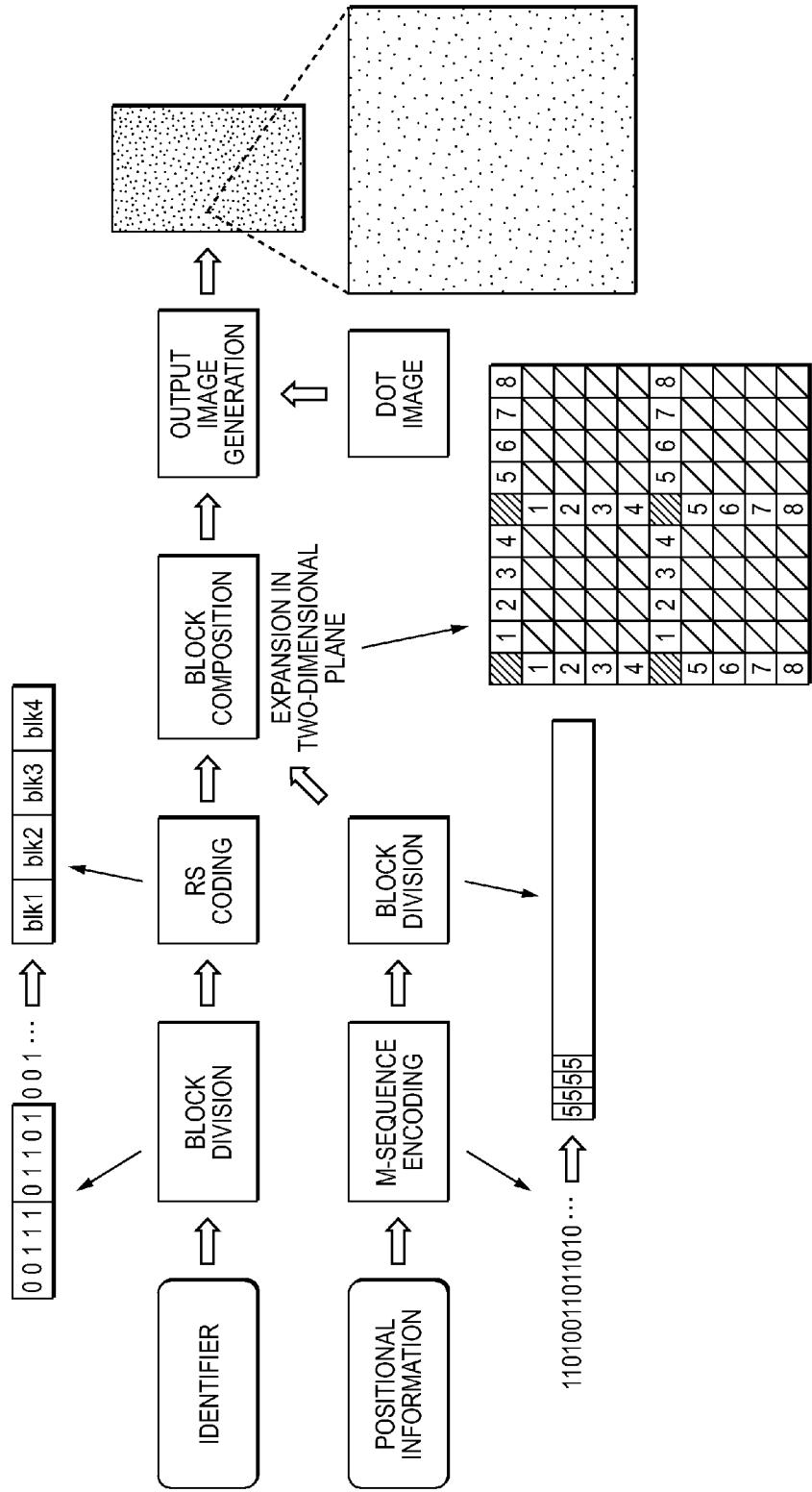
FIG. 8 is a diagram illustrating an example of an information encoding process and an example of an information image (dot code image) generation process in this embodiment.

FIG. 8 is a diagram illustrating an example of an information encoding process and an example of an information image (dot code image) generation process in this embodiment.

First, the encoding of the paper ID will be described.

An RS (Reed-Solomon) code in a block coding scheme is used to encode the paper ID. As described in FIG. 7, in this embodiment, a bit pattern which can express 5-bit information is used to embed information. Therefore, since an information error occurs in 5-bit units, the RS code with high coding efficiency in the block coding scheme is used. However, the code scheme is not limited to the RS code. Other code schemes, for example, BCH codes may be used.

As described above, in this embodiment, information is embedded using the bit pattern having 5-bit information. Therefore, the block length of the RS code needs to be 5 bits. For this reason, the paper ID is divided into blocks each having 5 bits. In FIG. 8, a first block "00111" and a second block "01101" are extracted from a paper ID "0011101101001 . . . ".

Then, an RS coding process is performed on the blocked paper ID. In FIG. 8, the paper ID is divided into blocks "blk1", "blk2", "blk3", "blk4", . . . and the RS coding process is performed on each block.

However, in this embodiment, the paper ID is divided into 16 (=4×4) blocks. Therefore, the number of code blocks in the RS codes can be 16.

In addition, the number of information blocks can be designed according to an error occurrence state. For example, when the number of information blocks is 8, the RS code is an RS (16, 8) code. Even when an error occurs in four blocks (=(16−8)÷2) in the encoded information, this code can correct the error. When the position of the error can be specified, correction capability can be further improved. In this case, the amount of information stored in the information block is 40 bits (=5 bits×8 blocks) and 32 bits of the 40 bits are used.

Next, the positional information encoding will be described.

M-sequence codes, which are one type of pseudo-random number sequence, are used to encode the positional information. Here, the M-sequence is a sequence having the maximum period which can be generated by K linear shift registers and has a sequence length of 2K−1. Arbitrary serial K bits extracted from the M-sequence do not appear at another position in the same M-sequence. Therefore, the use of this property makes it possible to encode the positional information.

However, in this embodiment, the M-sequence is generated by calculating the order of a necessary M-sequence from the length of the positional information to be encoded. However, when the length of the positional information to be encoded is known in advance, it is not necessary to generate the M sequence every time. In other words, a fixed M-sequence may be generated in advance and then stored in, for example, a memory.

For example, it is assumed that an M-sequence (K=13) with a sequence length of 8191 is used.

In this case, since the positional information is also embedded in 5-bit units, every 5 bits are extracted from the M-sequence with a sequence length of 8191 to form 5-bit blocks. In FIG. 8, an M-sequence "11010011011010 . . . " is divided into 5-bit blocks.

As such, in this embodiment, different encoding methods are used for the positional information and the paper ID. It is necessary to set the capability to detect the paper ID to be higher than the capability to detect the positional information. In other words, even when a portion of the positional information, which is used to acquire the position on the page face, cannot be decoded due to, for example, noise, only that portion is defective while other portions are unaffected. In contrast, when the paper ID fails to be decoded, it is difficult to detect a target in which writing information is reflected. Furthermore, this structure makes it possible to minimize an image reading range when the positional information and the paper ID are decoded. That is, since an encoding method that has boundaries, such as RS coding, is used for the positional information, it is necessary to read codes between the boundaries when decoding the RS codes. Therefore, the image reading range needs to double the range shown in FIG. 7B.

However, the use of the M-sequence makes it possible to read only the area which has the same size as the area shown in 7B. This is because the positional information can be decoded from an arbitrary partial sequence in the M-sequence, due to the properties of the M-sequence. In other words, when decoding the paper ID and the positional information, it is necessary to read the area with the size shown in FIG. 7B. However, the reading position does not need to be aligned with the boundary shown in FIG. 7B. The positional information can be decoded from a partial sequence at an arbitrary position of the M-sequence. The same information for the paper ID is arranged on the entire surface of the sheet. Therefore, even when the reading position deviates from the boundary shown in FIG. 7B, it is possible to rearrange fragments of the read information to restore the original information.

As described above, after the paper ID is divided into blocks, it is encoded with the RS codes. In addition, after the positional information is encoded with the M-sequence, it is divided into blocks. In this case, the blocks are combined as shown in FIG. 8. In other words, these blocks are expanded in a two-dimensional plane in a format as shown in FIG. 8. The format shown in FIG. 8 corresponds to the format shown in FIG. 7B. That is, a black square means a synchronous code.

In addition, numbers "1", "2", "3", "4", . . . which are arranged in the lateral direction mean X position codes and numbers "1", "2", "3", "4", . . . which are arranged in the vertical direction mean Y position codes. The position codes are represented by numbers corresponding to coordinate positions since information which is arranged on the sheet varies depending on the position of the sheet. A hatched square means an identification code. The identification codes are represented by the same marks since the same information is arranged even though the position of the sheet is different.

As can be seen from FIG. 8, there are four bit patterns between two synchronous codes. Therefore, it is possible to arrange partial sequences of a 20-bit (=5×4) M-sequence. When a 13-bit partial sequence is extracted from a 20-bit partial sequence, it is possible to specify a partial sequence including 13 bits among all partial sequences (8191). As such, when 13 bits of 20 bits are used to specify the position, the remaining 7 bits can be used to detect or correct errors in the extracted 13 bits. That is, it is possible to detect and correct errors by confirming 20-bit consistency using the same generation polynomial as that when the M-sequence is generated.

Then, the bit pattern of each block is converted into an image by referring to dot images. An output image which indicates information with dots is generated, as shown in the rightmost part of FIG. 8.

Figure 9:
FIG. 9 is a diagram illustrating an example of the data structure of an electronic document management table.

FIG. 9 is a diagram illustrating the data structure of an electronic document management table 910.

FIG. 9 shows an example of a table for managing an electronic document printed on each sheet.

As shown in FIG. 9, the electronic document management table 910 includes an identifier field 912, a form definition ID field 914, a printing parameter field 916, and a writing information field 920.

Identifier in the identifier field 912 is the paper ID.

The ID of a form definition which is used by the electronic document printed on each sheet during printing is included in the form definition ID field 914.

Printing parameters in the printing parameter field 916 are set when the electronic document is printed on each sheet. In FIG. 9, the printing parameters are shown in the format of "page (P), blank area (A, B, C, D)". Here, P indicates a page number and A, B, C, and D indicate the sizes (unit: mm) of the left, right, top, and bottom blank areas, respectively. In addition, here, the page and the blank area are given as the printing parameters. However, the invention is not limited thereto. In addition, it is possible to manage various printing parameters which are used for the general printing process.

Writing information which is superimposed on each electronic document is included in the writing information field 920. The writing information is data for each stroke by the electronic pen 235. Writing information regarding one stroke is represented by a string of coordinates (an X coordinate, a Y coordinate).

The electronic document management table 910 shown in FIG. 9 will be described in detail.

First, the first to fourth rows indicate that two electronic documents are printed on the basis of a form definition represented by a form definition ID "0010011". The electronic document associated with the form definition ID "0010011" includes two pages. At that time, the left, right, top, and bottom blank areas are 1 mm in one of the two printed pages and the left, right, top, and bottom blank areas are 2 mm in the other page.

Figure 12:
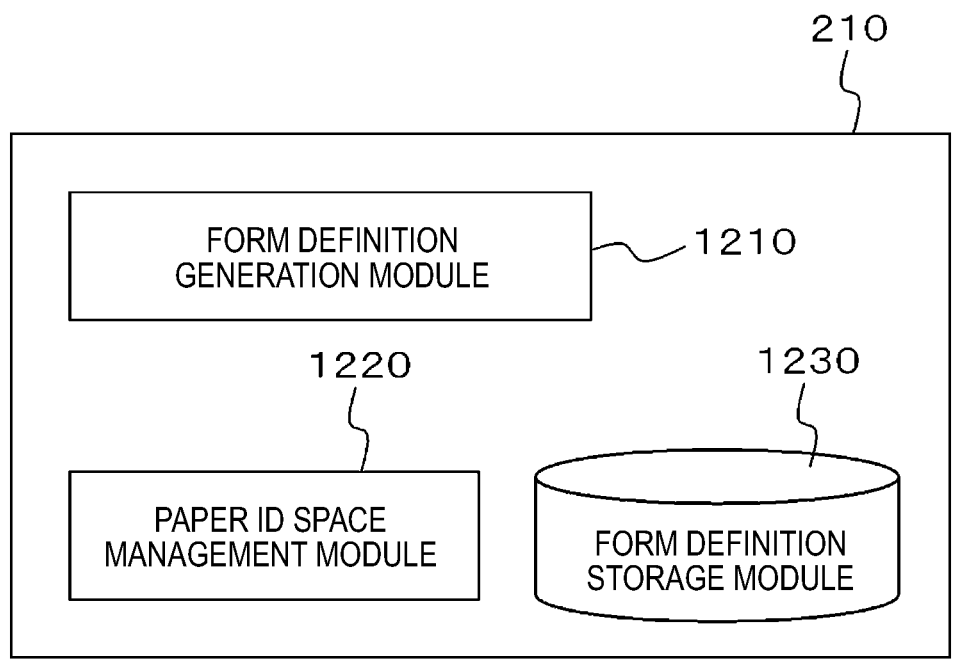
FIG. 12 is a conceptual module configuration diagram illustrating an example of the structure of a system for generating a form definition with a paper ID space.

FIG. 12 is a conceptual module configuration diagram illustrating an example of the structure of the form definition generation system 210.

The form definition generation system 210 includes a form definition generation module 1210, a paper ID space management module 1220, and a form definition storage module 1230. The form definition generation module 1210 corresponds to the reception module 100, the comparison module 110, the allocation module 120, and the allocation prohibition module 130. The paper ID space management module 1220 corresponds to the association module 140.

The form definition generation system 210 generates the form definition with a paper ID space. The form definition generation system 210 receives, from the user, instructions for the form definition and the size of a paper ID space allocated to the form definition, generates the form definition with a paper ID space to which a paper ID space with the instructed size is allocated, and outputs the form definition with a paper ID space.

The form definition storage module 1230 stores the form definition to which the paper ID space will be allocated. For example, the form definition storage module 1230 stores the field definition table 1000.

The paper ID space management module 1220 manages the paper ID space allocated to the form definition. When the size of the paper ID space to be allocated is input, the paper ID space management module 1220 outputs a detailed paper ID space with the designated size. The paper ID space management module 1220 stores a first ID and a last ID in the paper ID space which has not been allocated to any form definition. For example, the paper ID space management module 1220 stores "start: 00110000, end: 01FFFFFF". When receiving an instruction for the size of a partial space, the paper ID space management module 1220 outputs a partial space with a designated size having "start:" as a starting point. For example, when a size of 4096 is designated in decimal notation in the state of "start: 00110000, end: 01FFFFFF", "start: 00110000, end: 00110FFF" is output and "start: 00111000, end: 01FFFFFF" is stored in the paper ID space management module 1220.

The form definition generation module 1210 extracts the form definition from the form definition storage module 1230, allocates the paper ID space extracted from the paper ID space management module 1220 to the form definition to make a form definition with a paper ID space, and outputs the form definition with a paper ID space.

Figure 13:
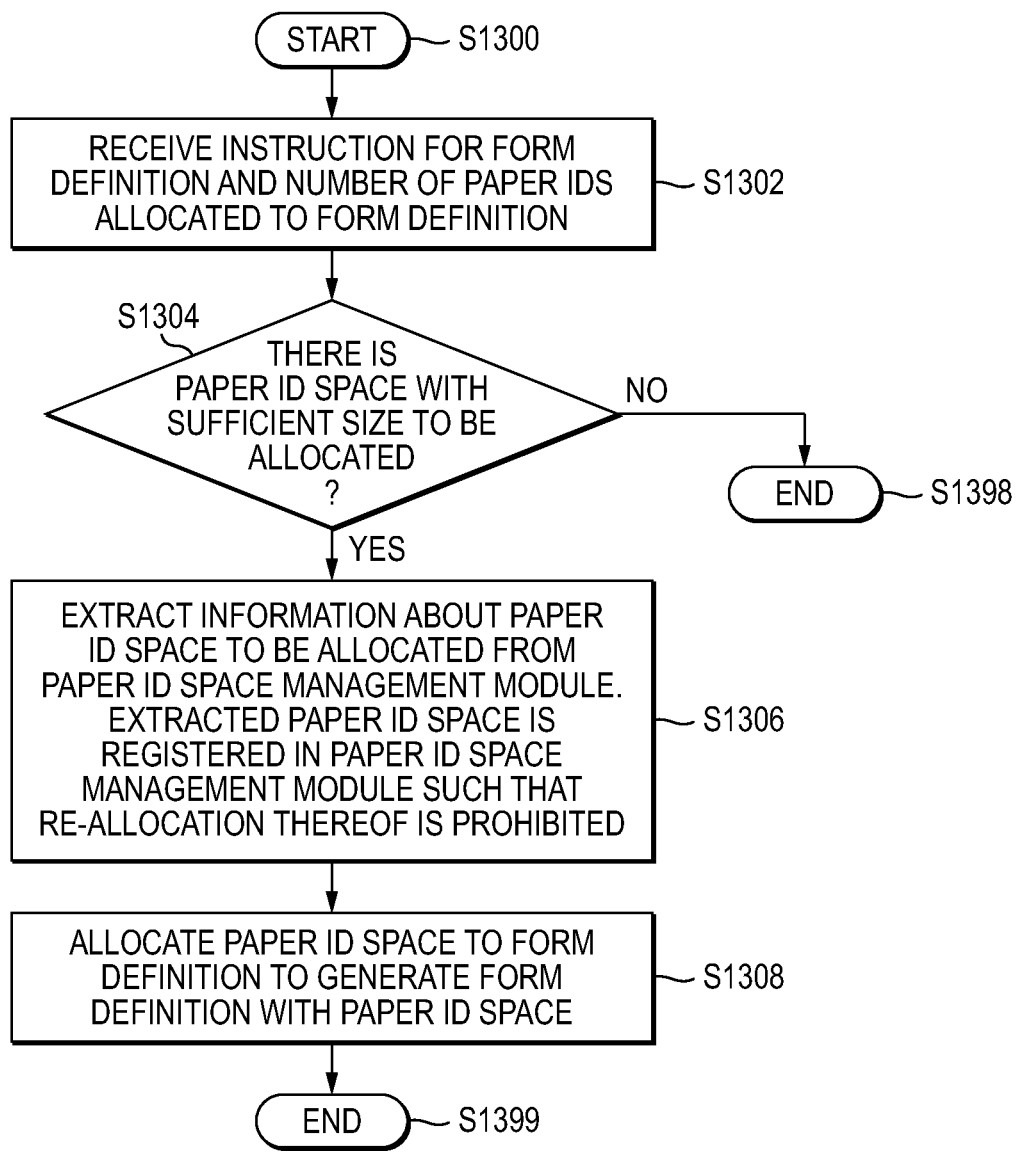
FIG. 13 is a flowchart illustrating an example of a process of the system for generating the form definition with a paper ID space.

FIG. 13 is a flowchart illustrating an example of the process of the form definition generation system 210.

In Step S1302, the reception module 100 receives the form definition and the number of paper IDs allocated to the form definition.

In Step S1304, the comparison module 110 determines whether there is a paper ID space with a sufficient size to be allocated. When there is a paper ID space with a sufficient size, the process proceeds to Step S1306. In the other cases, the process ends (Step S1398).

In Step S1306, the allocation module 120 extracts information about the paper ID space to be allocated from the paper ID space management module 1220. The allocation prohibition module 130 registers the extracted paper ID space in the paper ID space management module 1220 such that the paper ID space is prohibited from being re-allocated.

In Step S1308, the association module 140 allocates the paper ID space to the form definition to generate a form definition with a paper ID space.

Figure 14:
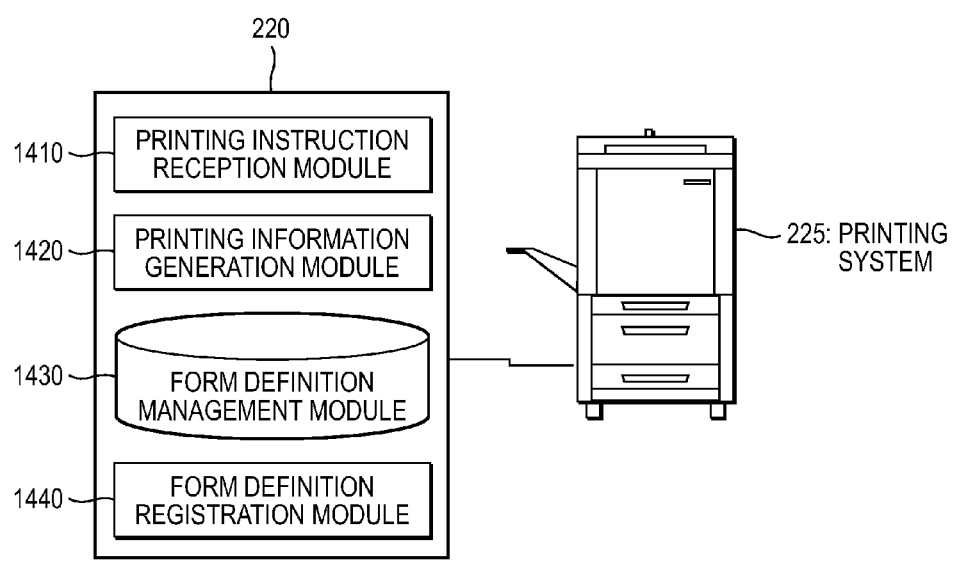
FIG. 14 is a conceptual module configuration diagram illustrating an example of the structure of an electronic pen sheet printing system.

FIG. 14 is a conceptual module configuration diagram illustrating an example of the structure of the electronic pen sheet printing system 220.

The electronic pen sheet printing system 220 includes a printing instruction reception module 1410, a printing information generation module 1420, a form definition management module 1430, and a form definition registration module 1440 and is connected to the printing system 225.

The printing instruction reception module 1410 designates a form definition to be printed as the electronic pen sheet among the form definitions with a paper ID space managed by the form definition management module 1430 and receives an instruction for the number of print copies. This instruction may be input by a keyboard operation of the operator or it may be predetermined.

The printing information generation module 1420 generates an information image indicating the paper ID for printing on the sheet. Then, the printing information generation module 1420 overlaps the generated information image on document information to generate a printing image.

Specifically, the printing information generation module 1420 generates the printing information on the basis of the instruction received by the printing instruction reception module 1410. The printing information is obtained by superimposing a dot code image, which is formed by unused paper IDs in the paper ID space allocated to the form definition with a paper ID space designated by the printing instruction reception module 1410, on the image information of the form definition included in the form definition with a paper ID space. The information of the paper ID used to generate the printing information is reflected in the form definition management module 1430. That is, for example, a flag indicating that the paper ID has been used is attached. It is preferable that the paper IDs to be allocated be allocated in ascending order or descending order in order to facilitate the management of the information of the used paper ID.

The printing system 225 prints the image generated by the printing information generation module 1420 on a sheet.

The form definition management module 1430 stores plural form definitions with a paper ID space. The form definition management module 1430 manages a portion which is consumed by printing in the allocated paper ID space in each form definition with a paper ID space.

The form definition registration module 1440 registers a new form definition with a paper ID space in the form definition management module 1430.

Figure 15:
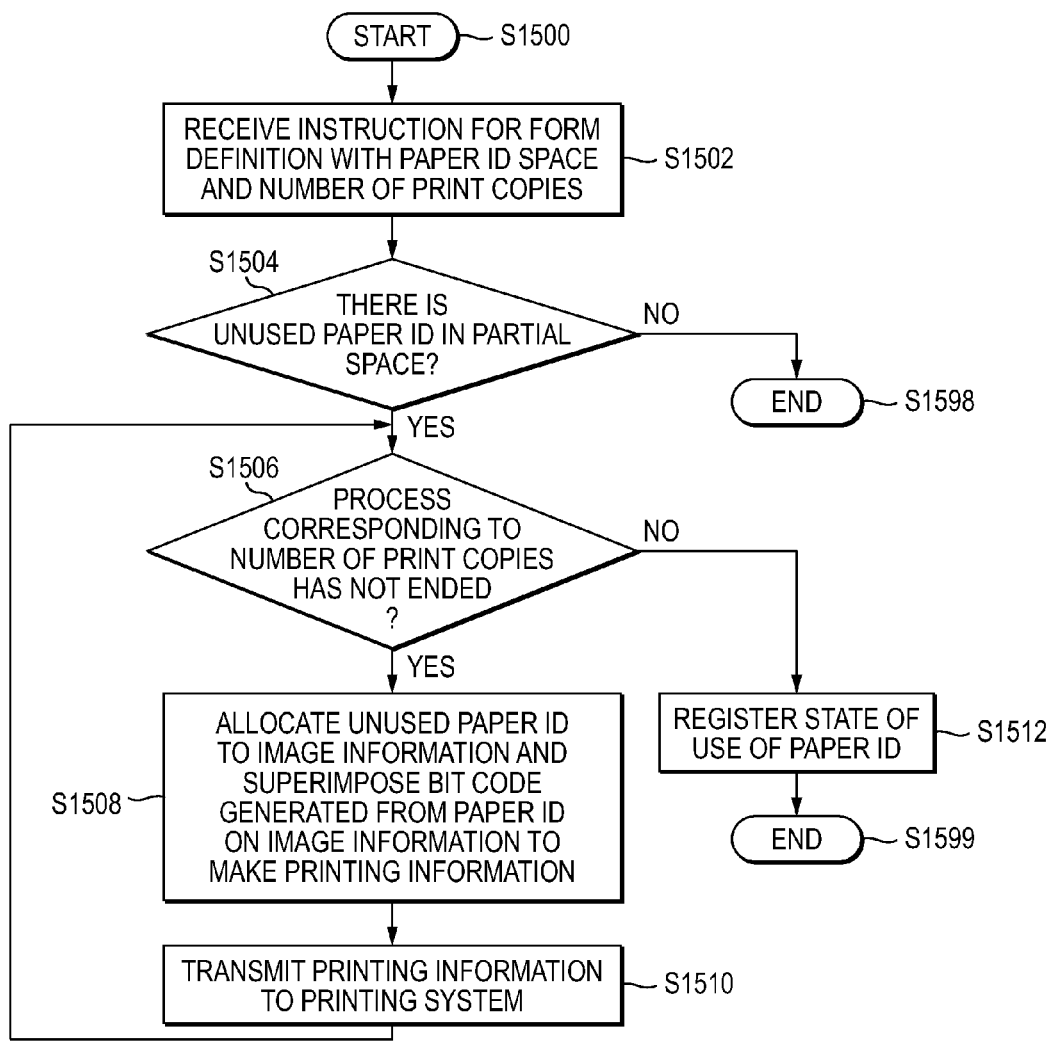
FIG. 15 is a flowchart illustrating an example of a process of the electronic pen sheet printing system.

FIG. 15 is a flowchart illustrating an example of the process of the electronic pen sheet printing system 220.

In Step S1502, the printing instruction reception module 1410 receives instructions for the form definition with a paper ID space and the number of print copies.

In Step S1504, the printing information generation module 1420 determines whether an unused paper ID remains in the paper ID group allocated to the designated form definition with a paper ID space. When an unused paper ID remains, the process proceeds to Step S1506. In the other cases, the process ends (Step S1598).

In Step S1506, the printing information generation module 1420 determines whether a process corresponding to the number of print copies ends. When the process does not end, the process proceeds to Step S1508. In the other cases, the process proceeds to Step S1512.

In Step S1508, the printing information generation module 1420 allocates the paper ID, which has not been used in the paper ID space allocated to the designated form definition with a paper ID space, to the image information, superimposes the dot code image generated from the paper ID on the image information to generate printing information.

In Step S1510, the printing information generation module 1420 transmits the printing information to the printing system 225. The printing system 225 prints the printing information on a sheet.

In Step S1512, the form definition registration module 1440 registers the usage state of the paper ID.

Figure 16:
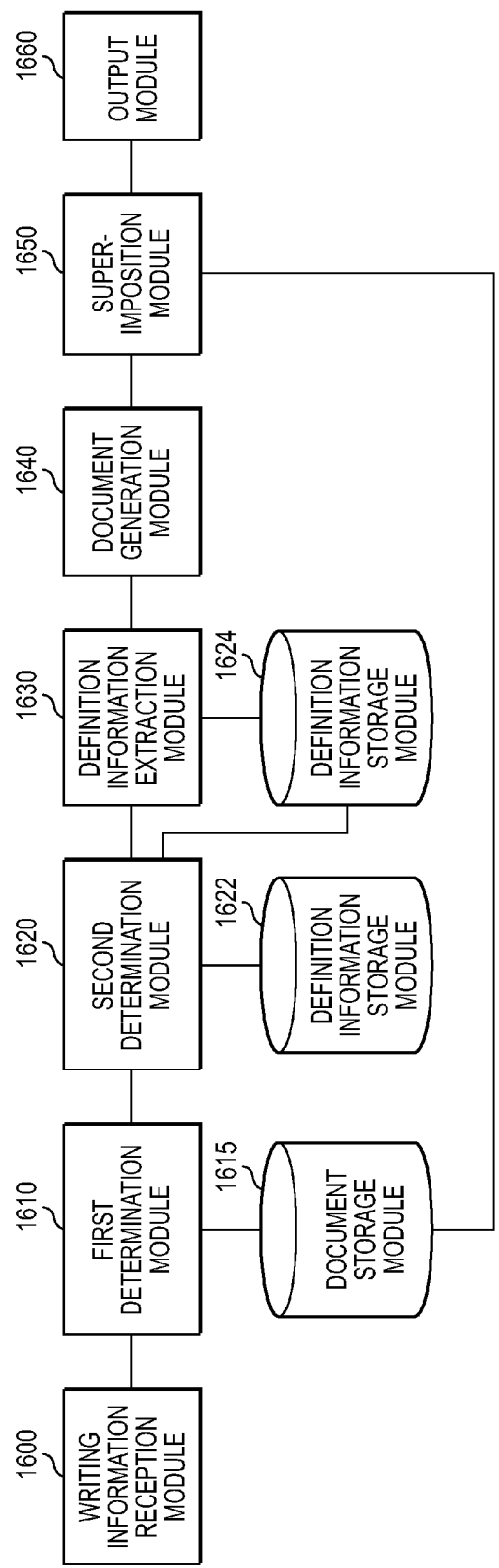
FIG. 16 is a conceptual module configuration diagram illustrating an example of a structure according to this embodiment.

FIG. 16 is a conceptual module configuration diagram illustrating an example of the structure of this embodiment and shows an example of the module configuration of the writing information processing system 230. That is, when data is written on the sheet printed by the printing system 225 with the electronic pen 235, the writing information processing system 230 acquires writing information about the written data and performs a process.

The writing information processing system 230 includes a writing information reception module 1600, a first determination module 1610, a document storage module 1615, a second determination module 1620, a writing information storage module 1622, a definition information storage module 1624, a definition information extraction module 1630, a document generation module 1640, a superimposition module 1650, and an output module 1660.

The writing information reception module 1600 is connected to the first determination module 1610. The writing information reception module 1600 receives, as the writing information, the content of data written on the sheet on which document information is printed and sheet identifier which is information for identifying the sheet. Specifically, the writing information reception module 1600 receives information decoded from the image read by the electronic pen 235.

The first determination module 1610 is connected to the writing information reception module 1600, the document storage module 1615, and the second determination module 1620. The first determination module 1610 determines whether to be able to extract an electronic document corresponding to the sheet identifier in the writing information received by the writing information reception module 1600. When the first determination module 1610 determines to extract the electronic document corresponding to the sheet identifier, the process proceeds to the superimposition module 1650. As described above, the superimposition module 1650 performs a process of superimposing the writing information on the electronic document.

The document storage module 1615 is connected to the first determination module 1610 and the superimposition module 1650. The document storage module 1615 stores the correspondence between the sheet identifier and the electronic document. Specifically, the document storage module 1615 stores the electronic document management table 910 shown in FIG. 9.

The second determination module 1620 is connected to the first determination module 1610, the writing information storage module 1622, the definition information storage module 1624, and the definition information extraction module 1630. When the first determination module 1610 determines not to be able to extract the electronic document, the second determination module 1620 determines whether to be able to extract the form definition which is associated with the definition identifier including the sheet identifier from the definition information storage module 1624. That is, the second determination module 1620 determines whether the sheet identifier has been subjected to the process of the form definition generation system 210.

When the second determination module 1620 determines not to be able to extract the form definition, it may perform control such that the writing information storage module 1622 stores the writing information received by the writing information reception module 1600. At the time when the process is performed by the writing information processing system 230, when information to be allocated to the sheet identifier in the writing information is not stored in the definition information storage module 1624, the writing information is stored. For example, there are the following cases: a case in which the correspondence table 1100 shown in FIG. 11 and the field definition table 1000 shown in FIG. 10 have not been generated yet; and a case in which the correspondence table 1100 and the field definition table 1000 have been generated, but have not been stored in the definition information storage module 1624 yet.

When the definition information storage module 1624 stores a new form definition with a paper ID space, the second determination module 1620 may determine whether to be able to extract a form definition corresponding to the sheet identifier in the writing information stored in the writing information storage module 1622 from the definition information storage module 1624. For example, this corresponds to a case in which the generated correspondence table 1100 and field definition table 1000 have been stored in the definition information storage module 1624 and a case in which the correspondence table 1100 and the field definition table 1000 are generated and stored in the definition information storage module 1624.

In addition, the same process as that performed on the writing information received by the writing information reception module 1600 may be performed on the writing information extracted from the writing information storage module 1622.

The definition information storage module 1624 is connected to the second determination module 1620 and the definition information extraction module 1630. The definition information storage module 1624 stores form definition with a paper ID space. Specifically, the definition information storage module 1624 stores the correspondence table 1100 shown in FIG. 11 and the field definition table 1000 shown in FIG. 10.

The writing information storage module 1622 is connected to the second determination module 1620. The writing information storage module 1622 stores the writing information when the second determination module 1620 determines not to be able to extract the writing information.

The definition information extraction module 1630 is connected to the second determination module 1620, the definition information storage module 1624, and the document generation module 1640. When the second determination module 1620 determines to be able to extract the form definition, the definition information extraction module 1630 extracts the form definition corresponding to the definition identifier including the sheet identifier from the definition information storage module 1624.

The document generation module 1640 is connected to the definition information extraction module 1630 and the superimposition module 1650. The document generation module 1640 generates an electronic document on the basis of the form definition extracted by the definition information extraction module 1630. The document generation module 1640 may generate the electronic document, using the form image 610 as well as the field definition 620.

The superimposition module 1650 is connected to the document generation module 1640, the output module 1660, and the document storage module 1615. The superimposition module 1650 superimposes the written content in the writing information received by the writing information reception module 1600 on the electronic document generated by the document generation module 1640 and registers the electronic document in the document storage module 1615. Specifically, the term "superimposition" or "overlap" means adding target written content to the writing information of the corresponding electronic document in the electronic document management table 910.

The output module 1660 is connected to the superimposition module 1650. The output module 1660 outputs the electronic document (the electronic document to which the written content is added) generated by the superimposition module 1650. The output of the electronic document includes, for example, the printing of the electronic document by a printing system, such as a printer, the display of the electronic document on a display device, such as a display, the transmission of images by an image transmission apparatus, such as a facsimile, the writing of images to an image storage device, such as an image database, and the transmission of the electronic document to other information processing apparatuses (for example, information processing apparatuses which analyze the writing information).

Figure 17:
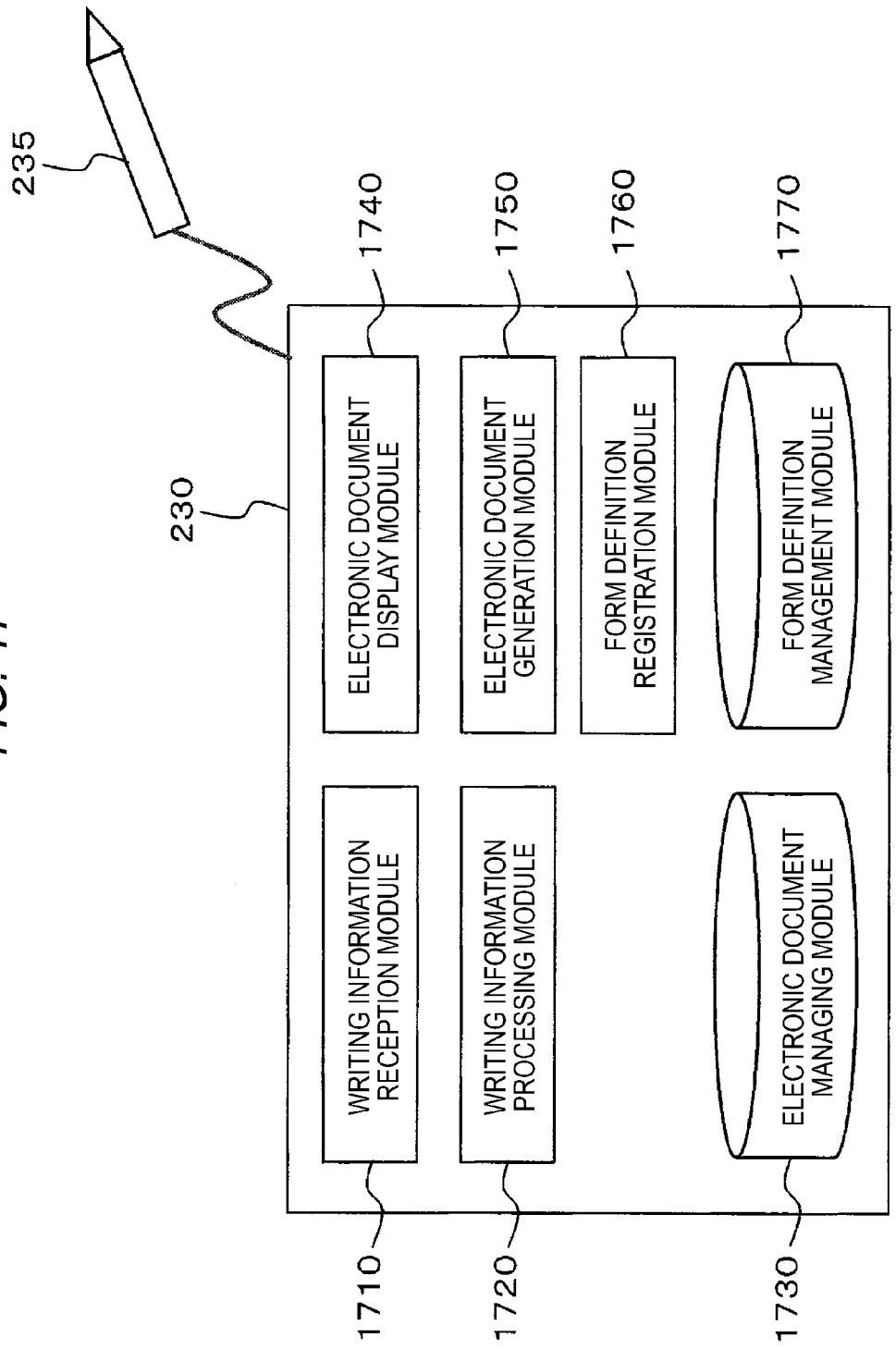
FIG. 17 is a conceptual module configuration diagram illustrating an example of the structure of a writing information processing system.

FIG. 17 is a conceptual module configuration diagram illustrating an example of the structure of the writing information processing system 230.

The writing information processing system 230 includes a writing information reception module 1710, a writing information processing module 1720, an electronic document management module 1730, an electronic document display module 1740, an electronic document generation module 1750, a form definition registration module 1760, and a form definition management module 1770. The writing information reception module 1710 corresponds to the writing information reception module 1600. The writing information processing module 1720 corresponds to the first determination module 1610, the second determination module 1620, and the superimposition module 1650. The electronic document management module 1730 corresponds to the document storage module 1615. The electronic document display module 1740 corresponds to the output module 1660. The electronic document generation module 1750 corresponds to the definition information extraction module 1630 and the document generation module 1640. The form definition management module 1770 corresponds to the definition information storage module 1624.

The writing information processing system 230 extracts the writing information from the electronic pen 235, processes the writing information, and manages the writing information.

The writing information acquired by the writing information processing system 230 is merged with the electronic document corresponding to the electronic pen sheet on which data has been written and is then stored in the electronic document management module 1730. Here, the term "merging" means writing (superimposing) the content of data on the electronic document. That is, data which is written on a physical electronic pen sheet is also written on the electronic document corresponding to the electronic pen sheet. Specifically, the writing information is added to a portion of the electronic document management table 910 corresponding to the electronic document.

As other functions, the writing information processing system 230 can extract the electronic document stored in the electronic document management module 1730 and display the content of the electronic document, or the writing information processing system 230 can perform handwritten letter recognition on the writing information in the electronic document and convert the writing information into text data.

The form definition management module 1770 stores plural form definitions with a paper ID space.

The form definition registration module 1760 registers a new form definition with a paper ID space in the form definition management module 1770.

The electronic document management module 1730 manages the electronic document.

The writing information reception module 1710 receives the writing information from the electronic pen.

The writing information processing module 1720 extracts the electronic document, in which the writing information received by the writing information reception module is to be merged, from the electronic document management module 1730, and merges the writing information with the electronic document, and stores the electronic document in the electronic document management module 1730 again. When a corresponding electronic document is not stored in the electronic document management module 1730, the writing information processing module 1720 calls the electronic document generation module 1750 and tries to generate an electronic document for merging the writing information.

The electronic document generation module 1750 generates an electronic document for merging the writing information.

The electronic document display module 1740 extracts the electronic document from the electronic document management module 1730 and displays the content of the electronic document.

Figure 18:
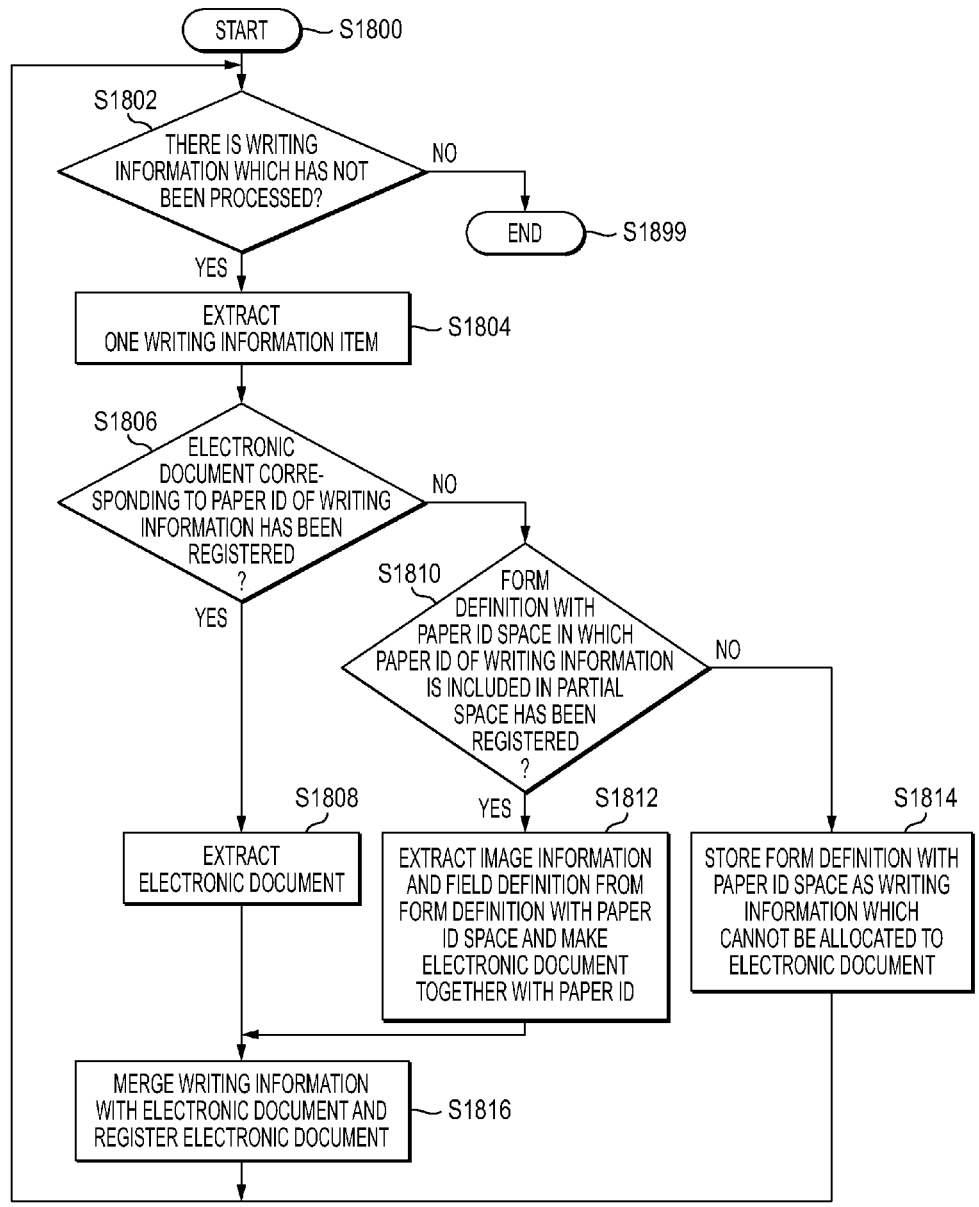
FIG. 18 is a flowchart illustrating an example of a process of the writing information processing system.

FIG. 18 is a flowchart illustrating an example of the process of the writing information processing system 230.

In Step S1802, the writing information reception module 1600 determines whether there is the writing information which has not been processed. When there is the writing information which has not been processed, the process proceeds to Step S1804. In the other cases, the process ends (Step S1899).

In Step S1804, the writing information reception module 1600 extracts one writing information item.

In Step S1806, the first determination module 1610 determines whether the electronic document corresponding to the paper ID included in the previous writing information has been registered in the document storage module 1615. When the electronic document has been registered, the process proceeds to Step S1808. In the other cases, the process proceeds to Step S1810.

In Step S1808, the document generation module 1640 extracts the electronic document corresponding to the paper ID from the document storage module 1615.

In Step S1810, the second determination module 1620 determines whether the form definition with a paper ID space in which the paper ID of the writing information is included in the definition identifier has been registered in the definition information storage module 1624. When the form definition with a paper ID space has been registered, the process proceeds to Step S1812. In the other cases, the process proceeds to Step S1814.

In Step S1812, the definition information extraction module 1630 extracts the form definition from the form definition with a paper ID space and the document generation module 1640 generates an electronic document having the paper ID included in the writing information on the basis of the form definition.

In Step S1814, the second determination module 1620 stores the writing information which cannot be allocated to the electronic document in the writing information storage module 1622. Writing information which is absent in the corresponding form definition with a paper ID space is stored as the writing information which cannot be allocated in the writing information storage module 1622.

In Step S1816, the superimposition module 1650 merges the writing information with the electronic document (the electronic document extracted in Step S1808 or the electronic document made in Step S1812) and registers the electronic document in the document storage module 1615.

Figure 19:
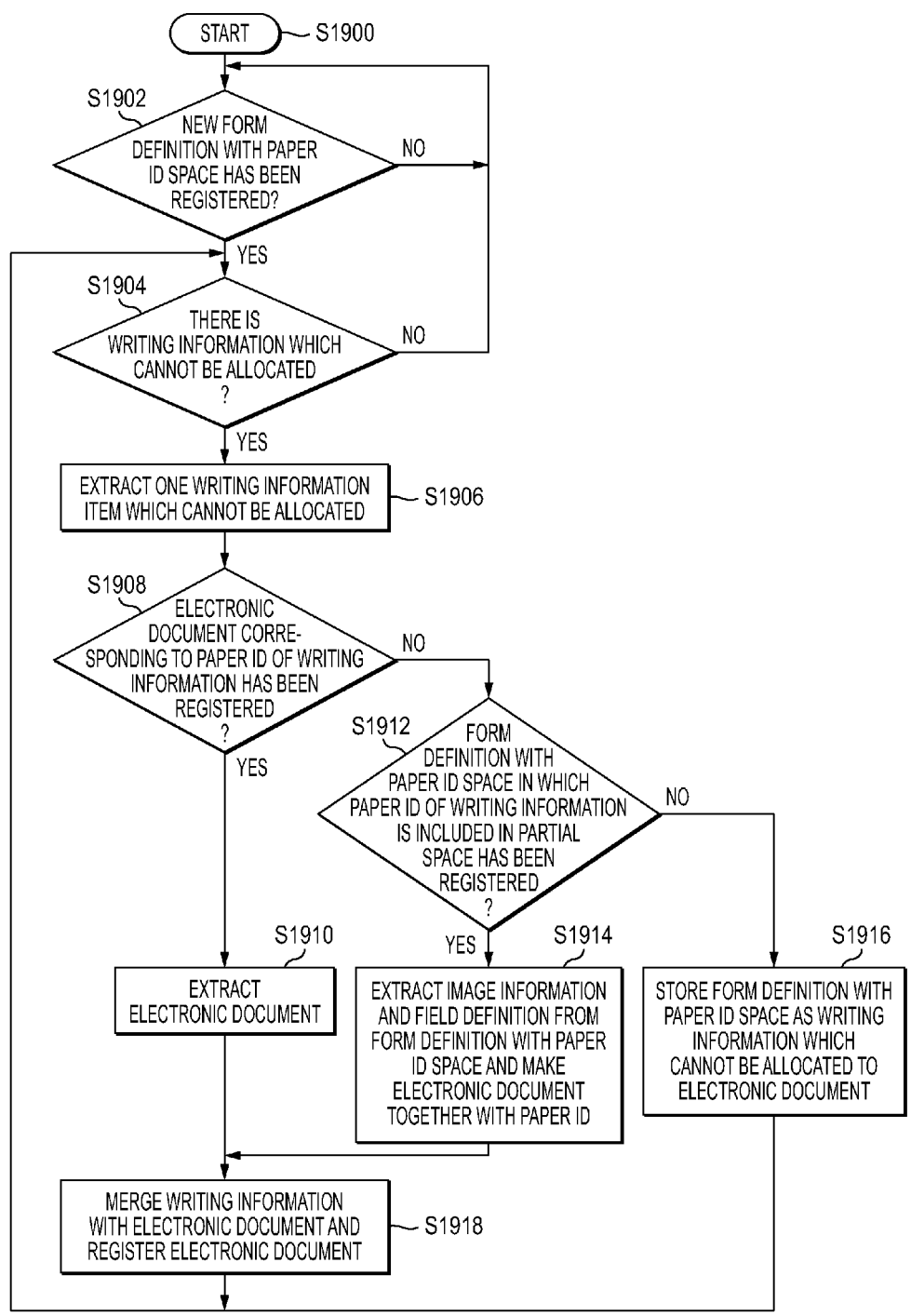
FIG. 19 is a flowchart illustrating another example of the process of the writing information processing system.

FIG. 19 is a flowchart illustrating an example of the process of the writing information processing system 230. The flowchart shows a process which checks whether writing information which is managed by the writing information storage module 1622 as writing information that cannot be allocated corresponds to a new form definition with a paper ID space when the new form definition with a paper ID space is registered, generates a new electronic document when the writing information corresponds to the new form definition with a paper ID space, and merges the writing information with the electronic document.

In Step S1902, the second determination module 1620 determines whether a new form definition with a paper ID space has been registered in the definition information storage module 1624. When the new form definition with a paper ID space has been registered, the process proceeds to Step S1904. In the other cases, the process returns to Step S1902.

In Step S1904, the first determination module 1610 determines whether there is writing information which cannot be allocated. When there is writing information which cannot be allocated, the process proceeds to Step S1906. In the other cases, the process returns to Step S1902.

In Step S1906, the first determination module 1610 extracts one writing information item which cannot be allocated.

In Step S1908, the first determination module 1610 determines whether an electronic document corresponding to the paper ID of the writing information has been registered in the document storage module 1615. When the electronic document has been registered, the process proceeds to Step S1910. In the other cases, the process proceeds to Step S1912.

In Step S1910, the document generation module 1640 extracts the electronic document corresponding to the paper ID from the document storage module 1615.

In Step S1912, the second determination module 1620 determines whether the form definition with a paper ID space in which the paper ID of the writing information is included in the definition identifier has been registered in the definition information storage module 1624. When the form definition with a paper ID space has been registered, the process proceeds to Step S1914. In the other cases, the process proceeds to Step S1916.

In Step S1914, the definition information extraction module 1630 extracts the form definition from the form definition with a paper ID space and the document generation module 1640 generates an electronic document having the paper ID included in the writing information on the basis of the form definition.

In Step S1916, the second determination module 1620 stores the writing information which cannot be allocated to the electronic document in the writing information storage module 1622.

In Step S1918, the superimposition module 1650 merges the writing information with the electronic document (the electronic document extracted in Step S1910 or the electronic document made in Step S1914) and registers the electronic document in the document storage module 1615.

Figure 20:
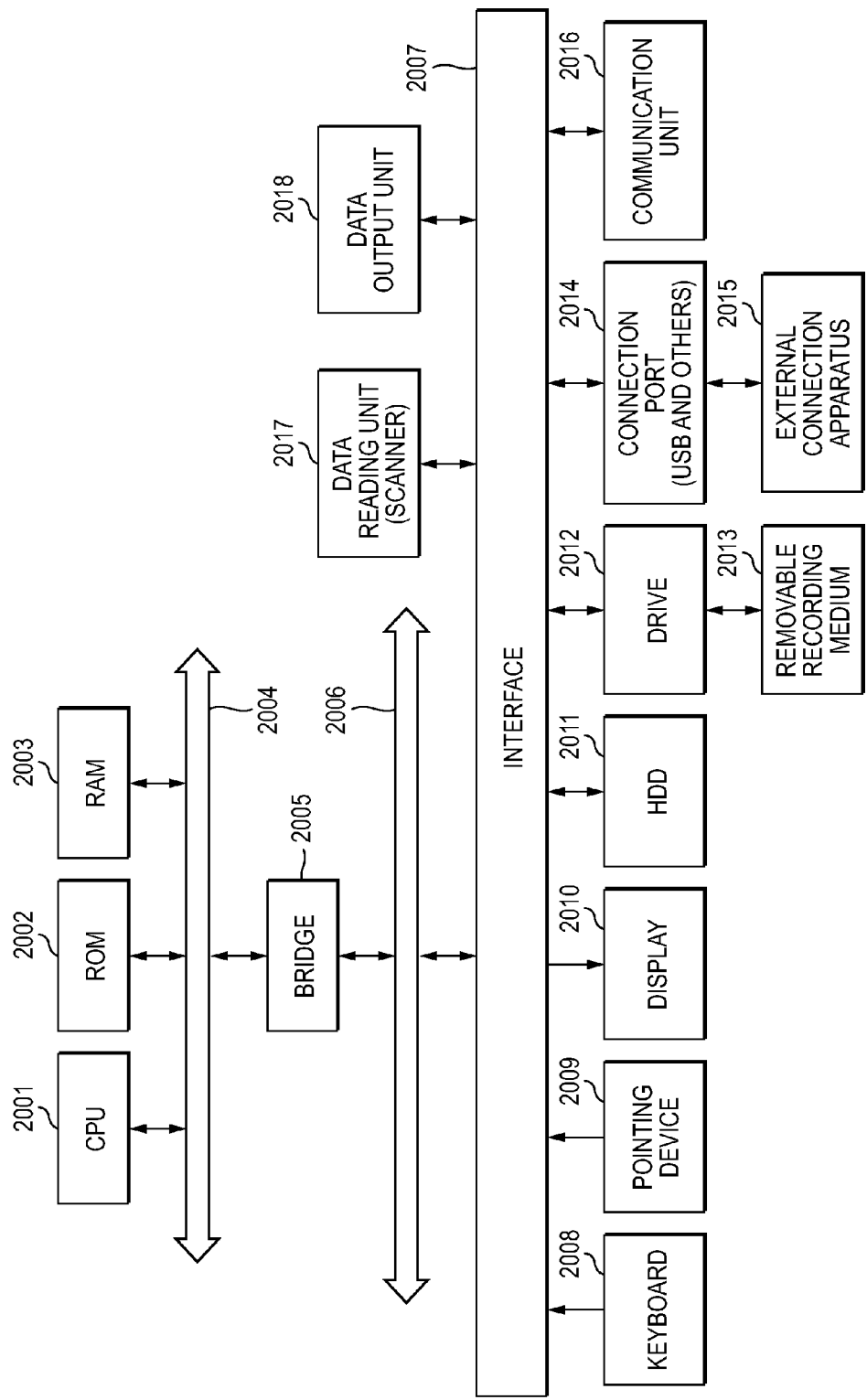
FIG. 20 is a block diagram illustrating an example of the hardware configuration of a computer for achieving this embodiment.

An example of the hardware configuration of the form definition generation system 210, the electronic pen sheet printing system 220, and the writing information processing system 230 according to this embodiment will be described with reference to FIG. 20. The configuration shown in FIG. 20 is formed by, for example, a personal computer (PC). FIG. 20 shows an example of hardware configuration including a data reading unit 2017, such as a scanner, and a data output unit 2018, such as a printer.

A central processing unit (CPU) 2001 is a control unit that executes processing according to a computer program in which an execution sequence of the following modules described in the embodiment is described: the reception module 100, the comparison module 110, the allocation module 120, the allocation prohibition module 130, the association module 140, the form definition generation module 1210, the form definition storage module 1230, the printing instruction reception module 1410, the printing information generation module 1420, the form definition registration module 1440, the writing information reception module 1600, the first determination module 1610, the document storage module 1615, the second determination module 1620, the writing information storage module 1622, the definition information storage module 1624, the definition information extraction module 1630, the document generation module 1640, the superimposition module 1650, the output module 1660, the writing information reception module 1710, the writing information processing module 1720, the electronic document display module 1740, the electronic document generation module 1750, and the form definition registration module 1760.

A read only memory (ROM) 2002 stores, for example, programs and operation parameters used by the CPU 2001. A random access memory (RAM) 2003 stores, for example, programs used in the execution of the CPU 2001 or parameters that are appropriately changed in the execution of the CPU 2001. These memory units are connected to each other by a host bus 2004 such as a CPU bus.

The host bus 2004 is connected to an external bus 2006, such as a peripheral component interconnect/interface (PCI) bus, through a bridge 2005.

A keyboard 2008 and a pointing device 2009, such as a mouse, are input devices operated by the operator. A display 2010, such as a liquid crystal display device or a cathode ray tube (CRT), displays various kinds of information as text or image information.

A hard disk drive (HDD) 2011 is provided with a hard disk and drives the hard disk to record or reproduce information or programs executed by the CPU 2001. The hard disk stores, for example, form definition information, document information, and information images. In addition, the hard disk stores various other computer programs, such as various data processing programs.

A drive 2012 reads data or a program recorded on an inserted removable recording medium 2013, such as a magnetic disk, an optical disc, a magneto-optical disk, or a semiconductor memory, and supplies the read data or program to the connected RAM 2003 through an interface 2007, the external bus 2006, the bridge 2005, and the host bus 2004. The removable recording medium 2013 can also be used as the same data recording region as the hard disk.

A connection port 2014 is a port used for connecting an external connection apparatus 2015 and has a connection portion, such as a universal serial bus (USB) port or an IEEE1394 port. The connection port 2014 is connected to, for example, the CPU 2001 through the interface 2007, the external bus 2006, the bridge 2005, and the host bus 2004. A communication unit 2016 is connected to a communication line and performs data communication with the outside. The data reading unit 2017 is, for example, a scanner and performs a document reading process. The data output unit 2018 is, for example, a printer and performs a document data output process.

The hardware configuration of the information processing apparatus shown in FIG. 20 is an illustrative example. This embodiment is not limited to the configuration shown in FIG. 20 and may have any configuration as long as it can execute the modules described in this embodiment. For example, some of the modules may be configured by dedicated hardware (for example, an application specific integrated circuit (ASIC)) or some of the modules may be installed in an external system and be connected to the information processing apparatus by a communication line. Alternatively, plural systems shown in FIG. 20 may be connected to each other by a communication line and may operate in cooperation with each other. In addition, the information processing apparatus may be incorporated into a copier, a facsimile, a scanner, a printer, or a multi-function machine (for example, an image processing apparatus having two or more of the functions of a scanner, a printer, a copier, and a facsimile).

The above-described program may be stored in a recording medium and then provided. In addition, the program may be provided by communication means. In this case, the above-described program may be regarded as a "computer-readable medium storing a program".

The "computer-readable medium storing a program" means a computer-readable recording medium having a program stored therein that is used to install, execute, and distribute the program.

Examples of the recording medium include digital versatile disks (DVDs), specifically, DVDs standardized by the DVD Forum, such as DVD-R, DVD-RW, and DVD-RAM, DVDs standardized by the DVD+RW alliance, such as DVD+R and DVD+RW, compact discs (CDs), such as a read only memory (CD-ROM), a CD recordable (CD-R), and a CD rewritable (CD-RW), a Blu-ray disc (registered trademark), a magneto-optical disk (MO), a flexible disk (FD), a magnetic tape, a hard disk, a read only memory (ROM), an electrically erasable programmable read only memory (EEPROM) (registered trademark), a flash memory, a random access memory (RAM), and a secure digital (SD) memory card.

The above-described program or a portion thereof may be recorded on the recording medium and then held or distributed. In addition, the program may be transmitted through communication using a transmission medium, such as a wired network used for, for example, a local area network (LAN), a metropolitan area network (MAN), a wide area network (WAN), the Internet, an intranet, or an extranet, a wireless communication network, or a combination of the networks. The program may also be transmitted using carrier waves.

In addition, the program may be a part of the other program, or may be recorded on the recording media with other individual program. Further, the program may be recorded on plural recording media separately. The program may be recorded with any forms as long as the program can be recovered, by the compression, encryption, and the like.

INDUSTRIAL APPLICABILITY

The information processing apparatus, the information processing program, the information processing method, and the computer-readable medium according to the invention are useful in the management of information written on a paper.

The invention has been described in detail with reference to a specific embodiment. It will be understood by the skilled in the art that various modifications and changes of the invention can be made without departing from the scope and spirit of the invention.

This application is based upon and claims the benefit of priority of the prior Japanese Patent application No. 2012-117230 filed on May, 23, 2012, the entire contents of which are incorporated herein by reference.

REFERENCE SIGNS LIST

100: RECEPTION MODULE
110: COMPARISON MODULE
120: ALLOCATION MODULE
130: ALLOCATION PROHIBITION MODULE
140: ASSOCIATION MODULE
210: FORM DEFINITION GENERATION SYSTEM
220: ELECTRONIC PEN SHEET PRINTING SYSTEM
225: PRINTING SYSTEM
230: WRITING INFORMATION PROCESSING SYSTEM
235: ELECTRONIC PEN
1210: FORM DEFINITION GENERATION MODULE
1220: PAPER ID SPACE MANAGEMENT MODULE
1230: FORM DEFINITION STORAGE MODULE
1410: PRINTING INSTRUCTION RECEPTION MODULE
1420: PRINTING INFORMATION GENERATION MODULE
1430: FORM DEFINITION MANAGEMENT MODULE
1440: FORM DEFINITION REGISTRATION MODULE
1600: WRITING INFORMATION RECEPTION MODULE
1610: FIRST DETERMINATION MODULE
1615: DOCUMENT STORAGE MODULE
1620: SECOND DETERMINATION MODULE
1622: WRITING INFORMATION STORAGE MODULE
1624: DEFINITION INFORMATION STORAGE MODULE
1630: DEFINITION INFORMATION EXTRACTION MODULE
1640: DOCUMENT GENERATION MODULE
1650: SUPERIMPOSITION MODULE
1660: OUTPUT MODULE
1710: WRITING INFORMATION RECEPTION MODULE
1720: WRITING INFORMATION PROCESSING MODULE

1730: ELECTRONIC DOCUMENT MANAGEMENT MODULE
1740: ELECTRONIC DOCUMENT DISPLAY MODULE
1750: ELECTRONIC DOCUMENT GENERATION MODULE
1760: FORM DEFINITION REGISTRATION MODULE
1770: FORM DEFINITION MANAGEMENT MODULE

The invention claimed is:

1. An information processing apparatus comprising:
a reception unit that receives the number of sheet identifiers to be allocated to a form definition which is information indicating a definition for an entry field in a sheet, the sheet identifier is information for identifying the sheet;
a comparison unit that compares the number of sheet identifiers received by the reception unit with the number of usable sheet identifier;
an information allocation unit that allocates the number of usable sheet identifiers that is equal to or greater than the number of sheet identifiers received by the reception unit among the usable sheet identifiers as a definition identifier to the form definition when the comparison result of the comparison unit shows that the number of sheet identifiers received by the reception unit is equal to or less than the number of usable sheet identifiers;
an excluding unit that excludes the sheet identifiers included in the definition identifier from the sheet identifiers to be allocated later; and
an association unit that associates the definition identifier with the form definition.

2. The information processing apparatus according to claim 1, further comprising:
a generation unit that generates an information image indicating the sheet identifier included in the definition identifier which is allocated to the form definition; and
a printing unit that superimposes the information image generated by the generation unit on document information and prints the document information on the sheet.

3. An information processing apparatus comprising:
a reception unit that receives, as writing information, content written to a sheet on which document information is printed and a sheet identifier which is information for identifying the sheet;
a first determination unit that determines whether to be able to extract an electronic document corresponding to the sheet identifier in the writing information which is received by the reception unit;
a second determination unit that determines whether to be able to extract a form definition associated with a definition identifier including the sheet identifier from a first storage unit which stores the definition identifier and the form definition so as to be associated with each other when the first determination unit determines not to be able to extract the electronic document;
an extraction unit that extracts the form definition from the first storage unit when the second determination unit determines to be able to extract the form definition;
a generation unit that generates the electronic document on the basis of the form definition extracted by the extraction unit; and
a superimposition unit that superimposes the written content in the writing information received by the reception unit on the electronic document generated by the generation unit.

4. The information processing apparatus according to claim 3, further comprising:
a storage control unit that performs control such that the writing information received by the reception unit is stored in a second storage unit when the second determination unit determines not to extract the form definition.

5. The information processing apparatus according to claim 4,
wherein, when a new combination of the definition identifier and the form definition is stored in the first storage unit, the second determination unit determines whether to be able to extract, from the first storage unit, a form definition corresponding to the sheet identifier in the writing information which is stored in the second storage unit.

6. A non-transitory computer readable medium storing a program causing a computer to execute a process for information processing, the process comprising:
receiving the number of sheet identifiers to be allocated to a form definition which is information indicating a definition for an entry field in a sheet, the sheet identifier is information for identifying the sheet;
comparing the received number of sheet identifiers with the number of usable sheet identifier;
allocating the number of usable sheet identifiers that is equal to or greater than the received number of sheet identifiers among the usable sheet identifiers as a definition identifier to the form definition when the comparison result shows that the received number of sheet identifiers is equal to or less than the number of usable sheet identifiers;
excluding the sheet identifier included in the definition identifier from the sheet identifiers to be allocated later; and
associating the definition identifier with the form definition.

* * * * *